United States Patent
White, II et al.

(10) Patent No.: US 7,224,272 B2
(45) Date of Patent: May 29, 2007

(54) POWER LINE REPEATER SYSTEM AND METHOD

(75) Inventors: Melvin Joseph White, II, Germantown, MD (US); Henry Nguyen Tran, Gaithersburg, MD (US); Alice Shirley Filemyr, Rockville, MD (US); Robert Douglas Kehn, Myersville, MD (US)

(73) Assignee: Current Technologies, LLC, Germantown, MD (US)

( * ) Notice: Subject to any disclaimer, the term of this patent is extended or adjusted under 35 U.S.C. 154(b) by 81 days.

(21) Appl. No.: 11/091,677

(22) Filed: Mar. 28, 2005

(65) Prior Publication Data

US 2005/0168326 A1   Aug. 4, 2005

Related U.S. Application Data

(63) Continuation-in-part of application No. 10/315,725, filed on Dec. 10, 2002, now Pat. No. 6,998,962.

(60) Provisional application No. 60/633,737, filed on Dec. 6, 2004.

(51) Int. Cl.
  *G08B 1/08* (2006.01)
  *H04B 1/38* (2006.01)
  *H04M 11/04* (2006.01)

(52) U.S. Cl. .............. 340/538; 340/425.1; 340/310.11; 340/310.16; 340/310.17; 340/310.18; 375/257

(58) Field of Classification Search ............... 340/538, 340/425.1, 310.11, 310.16, 310.17, 310.18
  See application file for complete search history.

(56) References Cited

U.S. PATENT DOCUMENTS

| | | | |
|---|---|---|---|
| 2,577,731 A | 12/1951 | Berger | |
| 3,656,112 A | 4/1972 | Paull | |
| 3,810,096 A | 5/1974 | Kabat et al. | |
| 3,911,415 A | 10/1975 | Whyte | |
| 3,942,168 A | 3/1976 | Whyte | |
| 3,942,170 A | 3/1976 | Whyte | |

(Continued)

FOREIGN PATENT DOCUMENTS

DE   197 28 270 A1   1/1999

(Continued)

OTHER PUBLICATIONS

"EMETCON Automated Distribution System: Communications Guide", *Westinghouse ABB Power T & D Company Technical Manual 42-6001A.*, (Sep. 1989), 1-55.

(Continued)

*Primary Examiner*—Donnie L. Crosland
(74) *Attorney, Agent, or Firm*—Mel Barnes; Capital Legal Group, LLC

(57) ABSTRACT

A PLCS network element that provides communications to one or more user devices and may also repeat data for other network elements is provided. In one embodiment, the device includes software for discovering its upstream gateway, for acting as a gateway for other devices, and for relaying DHCP transmissions. In addition, the device includes software for receiving and processing commands from a remote computer system that may include commands enabling and disabling the repeater functionality. Finally, the device may also include software for receiving and processing configuration information that may include, for example, information of the other network devices for which it will repeat.

42 Claims, 11 Drawing Sheets

U.S. PATENT DOCUMENTS

| | | |
|---|---|---|
| 3,944,723 A | 3/1976 | Fong |
| 3,967,264 A | 6/1976 | Whyte et al. |
| 3,973,087 A | 8/1976 | Fong |
| 3,973,240 A | 8/1976 | Fong |
| 4,004,110 A | 1/1977 | Whyte |
| 4,012,733 A | 3/1977 | Whyte |
| 4,057,793 A | 11/1977 | Johnson et al. |
| 4,060,735 A | 11/1977 | Pascucci et al. |
| 4,250,489 A | 2/1981 | Dudash et al. |
| 4,357,598 A | 11/1982 | Melvin, Jr. |
| 4,408,186 A | 10/1983 | Howell |
| 4,433,284 A | 2/1984 | Perkins |
| 4,473,816 A | 9/1984 | Perkins |
| 4,473,817 A | 9/1984 | Perkins |
| 4,475,209 A | 10/1984 | Udren |
| 4,569,045 A | 2/1986 | Schieble et al. |
| 4,599,598 A | 7/1986 | Komoda et al. |
| 4,638,298 A | 1/1987 | Spiro |
| 4,642,607 A | 2/1987 | Strom et al. |
| 4,675,648 A | 6/1987 | Roth et al. |
| 4,686,382 A | 8/1987 | Shuey |
| 5,272,462 A | 12/1993 | Teyssandier et al. |
| 5,559,377 A | 9/1996 | Abraham |
| 5,625,863 A | 4/1997 | Abraham |
| 5,684,450 A | 11/1997 | Brown |
| 5,717,685 A | 2/1998 | Abraham |
| 5,726,980 A | 3/1998 | Rickard |
| 5,777,769 A | 7/1998 | Coutinho |
| 5,818,821 A | 10/1998 | Schurig |
| 5,856,776 A | 1/1999 | Armstrong et al. |
| 5,870,016 A | 2/1999 | Shresthe |
| 5,929,750 A | 7/1999 | Brown |
| 5,933,071 A | 8/1999 | Brown |
| 5,937,342 A | 8/1999 | Kline |
| 5,949,327 A | 9/1999 | Brown |
| 5,952,914 A | 9/1999 | Wynn |
| 5,978,371 A | 11/1999 | Mason, Jr. et al. |
| 5,994,998 A | 11/1999 | Fisher et al. |
| 6,014,386 A | 1/2000 | Abraham |
| 6,040,759 A | 3/2000 | Sanderson |
| 6,144,292 A | 11/2000 | Brown |
| 6,151,330 A | 11/2000 | Liberman |
| 6,157,292 A | 12/2000 | Piercy et al. |
| 6,160,795 A | 12/2000 | Hosemann |
| 6,172,597 B1 | 1/2001 | Brown |
| 6,275,144 B1 | 8/2001 | Rumbaugh |
| 6,281,784 B1 | 8/2001 | Redgate et al. |
| 6,282,405 B1 | 8/2001 | Brown |
| 6,300,881 B1 | 10/2001 | Yee et al. |
| 6,331,814 B1 | 12/2001 | Albano |
| 6,346,875 B1 | 2/2002 | Puckette et al. |
| 6,373,377 B1 | 4/2002 | Sacca et al. |
| 6,396,392 B1 | 5/2002 | Abraham |
| 6,407,987 B1 | 6/2002 | Abraham |
| 6,452,482 B1 | 9/2002 | Cern |
| 6,480,510 B1 | 11/2002 | Binder |
| 6,624,532 B1 | 9/2003 | Davidow |
| 6,646,447 B2 | 11/2003 | Cern et al. |
| 6,668,058 B2 | 12/2003 | Grimes |
| 6,844,809 B2 | 1/2005 | Manis et al. |
| 6,854,059 B2 | 2/2005 | Gardner |
| 6,885,674 B2 | 4/2005 | Hunt et al. |
| 6,922,135 B2 | 7/2005 | Abraham |
| 6,933,835 B2 | 8/2005 | Kline |
| 6,950,567 B2 | 9/2005 | Kline |
| 6,958,680 B2 | 10/2005 | Kline |
| 6,965,302 B2 | 11/2005 | Mollenkopf et al. |
| 6,965,303 B2 | 11/2005 | Mollenkopf |
| 6,977,578 B2 | 12/2005 | Kline |
| 6,980,090 B2 | 12/2005 | Mollenkopf |
| 6,980,091 B2 | 12/2005 | White et al. |
| 6,985,714 B2 | 1/2006 | Akiyama et al. |
| 6,998,962 B2 | 2/2006 | Cope et al. |
| 7,042,351 B2 | 5/2006 | Kline |
| 7,046,882 B2 | 5/2006 | Kline |
| 7,075,414 B2 | 7/2006 | Giannini et al. |
| 7,098,773 B2 | 8/2006 | Berkman |
| 7,103,240 B2 | 9/2006 | Kline |
| 2001/0054953 A1 | 12/2001 | Kline |
| 2002/0002040 A1 | 1/2002 | Kline et al. |
| 2002/0027496 A1 | 3/2002 | Cern et al. |
| 2002/0048368 A1 | 4/2002 | Gardner |
| 2002/0097953 A1 | 7/2002 | Kline |
| 2002/0105413 A1 | 8/2002 | Cern et al. |
| 2002/0109585 A1 | 8/2002 | Sanderson |
| 2002/0110310 A1 | 8/2002 | Kline |
| 2002/0110311 A1 | 8/2002 | Kline |
| 2002/0118101 A1 | 8/2002 | Kline |
| 2002/0121963 A1 | 9/2002 | Kline |
| 2002/0154000 A1 | 10/2002 | Kline |
| 2003/0039257 A1 | 2/2003 | Manis |
| 2003/0054793 A1 | 3/2003 | Manis et al. |
| 2003/0067910 A1 | 4/2003 | Razazian et al. |
| 2003/0129978 A1 | 7/2003 | Akiyama et al. |
| 2003/0160684 A1 | 8/2003 | Cern |
| 2003/0169155 A1 | 9/2003 | Mollenkopf et al. |
| 2003/0184433 A1 | 10/2003 | Zalitzky et al. |
| 2003/0224784 A1 | 12/2003 | Hunt et al. |
| 2003/0227373 A1 | 12/2003 | Lou et al. |
| 2004/0037317 A1 | 2/2004 | Zalizky et al. |
| 2004/0056734 A1 | 3/2004 | Davidow |
| 2004/0067745 A1 | 4/2004 | Belsak |
| 2004/0083066 A1 | 4/2004 | Hayes et al. |
| 2004/0110483 A1 | 6/2004 | Mollenkopf |
| 2004/0113756 A1 | 6/2004 | Mollenkopf |
| 2004/0113757 A1 | 6/2004 | White, II et al. |
| 2004/0135676 A1 | 7/2004 | Berkman et al. |
| 2004/0157551 A1 | 8/2004 | Gainey et al. |
| 2004/0160990 A1 | 8/2004 | Logvinov et al. |
| 2004/0163128 A1 | 8/2004 | Phillips et al. |
| 2004/0168199 A1 | 8/2004 | Phillips et al. |
| 2004/0174851 A1 | 9/2004 | Zalitzky et al. |
| 2004/0223617 A1 | 11/2004 | Corcoran et al. |
| 2004/0227621 A1 | 11/2004 | Cope et al. |
| 2004/0227622 A1 | 11/2004 | Giannini et al. |
| 2004/0233928 A1 | 11/2004 | Pozsgay |
| 2004/0242185 A1 | 12/2004 | Lee |
| 2005/0040809 A1 | 2/2005 | Uber, III et al. |
| 2005/0046550 A1 | 3/2005 | Crenshaw et al. |
| 2005/0063422 A1 | 3/2005 | Lazar et al. |
| 2005/0068223 A1 | 3/2005 | Vavik |
| 2005/0111533 A1 | 5/2005 | Berkman |
| 2005/0128057 A1 | 6/2005 | Mansfield et al. |
| 2005/0168326 A1 | 8/2005 | White et al. |
| 2005/0212688 A1 | 9/2005 | Chung |
| 2005/0220004 A1 | 10/2005 | Vollmer et al. |
| 2005/0285720 A1 | 12/2005 | Cope et al. |
| 2006/0044076 A1 | 3/2006 | Law |
| 2006/0045105 A1 | 3/2006 | Dobosz et al. |
| 2006/0049693 A1 | 3/2006 | Abraham et al. |
| 2006/0073805 A1 | 4/2006 | Zumkeller et al. |
| 2006/0082219 A1 | 4/2006 | Gerszberg et al. |
| 2006/0097573 A1 | 5/2006 | Gidge et al. |
| 2006/0146866 A1 | 7/2006 | Stephan et al. |
| 2006/0165054 A1 | 7/2006 | Iwamura |

FOREIGN PATENT DOCUMENTS

| | | |
|---|---|---|
| DE | 100 61 584 A1 | 6/2002 |
| EP | 0 470 185 B1 | 11/1995 |
| EP | 0 822 721 A2 | 2/1998 |
| EP | 0 822 721 A3 | 2/1998 |
| EP | 0 913 955 A2 | 5/1999 |
| EP | 1 217 760 A1 | 6/2002 |

| | | |
|---|---|---|
| EP | 1 021 866 B1 | 10/2002 |
| EP | 1 251 646 A2 | 10/2002 |
| GB | 2 293 950 A | 4/1996 |
| JP | 1276933 | 11/1989 |
| JP | 10200544 A2 | 7/1998 |
| WO | WO-01/08321 A1 | 2/2001 |
| WO | WO-03/009083 A2 | 1/2003 |
| WO | WO-03/009083 A3 | 1/2003 |
| WO | WO-03/010896 A1 | 2/2003 |
| WO | WO-03/30396 A2 | 4/2003 |
| WO | WO-03/039022 A1 | 5/2003 |
| WO | WO-2004/008656 A1 | 1/2004 |
| WO | WO 04102868 | 11/2004 |

OTHER PUBLICATIONS

"HomePlug 1.01 Specification", *HomePlug Powerline Alliance*, (Dec. 1, 2001), 1-39.

"HomePlug Initial Draft Medium Interface Specification", *HomePlug Powerline Alliance*, (Jul. 27, 2000), 1-109.

"HomePlug Initial Draft Medium Interface Specification", *HomePlug Powerline Alliance*, (May 19, 2000), 1-109.

"HomePlug Powerline Alliance", *HomePlug 0.5 Draft Medium Interface Specification.*, (Nov. 28, 2000), 1-133.

"IEEE Guide for Power-Line Carrier Applications, ANSI/IEEE Std 643-1980", *The Institute of Electrical and Electronics Engineers, Inc.*, (1980), 1-80.

"Outlook Conference 2004: Amperion Deployment Overview", *Primen Conference*, (May 7, 2004), 1-10.

"PLC, A New Competitor in Broadband Internet Access", *Power Line Communications Conference*, (Dec. 12, 2001), 1-60.

"Power Line Communications", *Power Line Communications*, www.plexeon.com/power.html, (1998), 1-2.

"White Paper on Medium Voltage Powerline Communication (PLC) Networks", *CIGRE SC D2 WG 14, Broadband PLC*, (Mar. 2005), 1-58.

Barstow, J M., "A Carrier Telephone System for Rural Service", *AIEE Transactions*, (1947), 301-307.

Chen, Y-F, et al., "Baseband Transceiver Design of a 128-Kbps Power-Line Modem for Household Applications", *IEEE Transactions on Power Delivery*, (2002), 338-344.

Dostert, K, "EMC Aspects of High Speed Powerline Communications", *Proceedings of the 15th International Wroclaw Symposium and Exhibition on Electromagnetic Capability*, (Jun. 27-30, 2000), 98-102.

Dostert, K, "Powerline Communications, Ch. 5", *Powerline Communications*, (2001), 286, 288-292.

Feduschak, N A., "Waiting in the Wings: Is Powerline Technology Ready to Compete with Cable?", www.cabletoday.com/ic2/archives/0301/0301powerline.htm, (Mar. 2001), 1-5.

Gutzwiller, F W., et al., "Homenet: A Control Network for Consumer Applications", *IEEE Transactions on Consumer Electronics*, (Aug. 1983), 297-304.

Jee, G, et al., "Demonstration of the Technical Viability of PLC Systems on Medium- and Low-Voltage Lines in the United States", *IEEE Communication Magazine*, (May 2003), 108-112.

Lokken, G, et al., "The Proposed Wisconsin Eectric Power Company Load Management System Using Power Line Carrier Over Distribution Lines", *1976 National Telecommunications Conference, IEEE*, (1976), 2.2-1 2.2-3.

Onunga, J, et al., "Distribution Line Communications Using CSMA Access Control with Priority Acknowledgements", *IEEE Transactions on Power Delivery*, (Apr. 1989), 878-886.

Yoshitoshi, M, et al., "Proposed Interface Specifications for Home Bus", *IEEE Transactions on Consumer Electronics*, (Aug. 1986), 550-557.

Horiguchi, Akira, "High Speed Power Line Communication Technology", *Mitsubishi Electric Advance* vol. 109, (Mar. 2005), 1-27.

POWER LINE REPEATER SYSTEM AND METHOD

CROSS-REFERENCE TO RELATED APPLICATIONS

This application is a continuation-in-part and claims priority under 35 U.S.C. § 120 to U.S. patent application Ser. No. 10/315,725 filed Dec. 10, 2002, issued as U.S. Pat. No. 6,998,962; and this application is a continuation-in-part and claims priority under 35 U.S.C. § 119(e) to U.S. Provisional Patent Application Ser. No. 60/633,737 filed Dec. 6, 2004, both of which are incorporated herein by reference in their entirety.

FIELD OF THE INVENTION

The present invention generally relates to data communications over a power distribution system and more particularly, to a system that employs repeating communications over power lines and a method of using the same.

BACKGROUND OF THE INVENTION

Well-established power distribution systems exist throughout most of the United States, and other countries, which provide power to customers via power lines. With some modification, the infrastructure of the existing power distribution systems can be used to provide data communication in addition to power delivery, thereby forming a power line communication system (PLCS). In other words, existing power lines that already have been run to many homes and offices, can be used to carry data signals to and from the homes and offices. These data signals are communicated on and off the power lines at various points in the power line communication system, such as, for example, near homes, offices, Internet service providers, and the like.

While the concept may sound simple, there are many challenges to overcome in order to use power lines for data communication. Overhead power lines are not designed to provide high speed data communications and are very susceptible to interference. Additionally, federal regulations limit the amount of radiated energy of a power line communication system, which therefore limits the strength of the data signal that can be injected onto power lines (especially overhead power lines). Consequently, due to the attenuation of the power lines, communications signals typically will travel only a relatively short distance on power lines. In addition, the distance may vary from location to location.

Power distribution systems include numerous sections, which transmit power at different voltages. The transition from one section to another typically is accomplished with a transformer. The sections of the power distribution system that are connected to the customers premises typically are low voltage (LV) sections having a voltage between 100 volts (V) and 240V, depending on the system. In the United States, the LV section typically is about 120V. The sections of the power distribution system that provide the power to the LV sections are referred to as the medium voltage (MV) sections. The voltage of the MV section is in the range of 1,000V to 100,000V. The transition from the MV section to the LV section of the power distribution system typically is accomplished with a distribution transformer, which converts the higher voltage of the MV section to the lower voltage of the LV section.

Power system transformers are one obstacle to using power distribution lines for data communication. Transformers act as a low-pass filter, passing the low frequency signals (e.g., the 50 or 60 Hz) power signals and impeding the high frequency signals (e.g., frequencies typically used for data communication). As such, power line communication systems face the challenge of communicating the data signals around, or through, the distribution transformers.

In addition, power lines are susceptible to ingress noise, which may vary from location to location. As a result, layout and network planning of a power line communications system may be difficult due to the unpredictability of the power line communications channels. Thus, there is a need for a power line communications device that can service customers and also repeat the data for other network elements and that can be dynamically configured and re-configured by a network management system. These and other advantages may be provided by various embodiments of the present invention.

SUMMARY OF THE INVENTION

The present invention provides a PLCS network element that provides communications to one or more user devices and may also repeat data for other network elements. In one embodiment, the device includes software for discovering its upstream gateway, for acting as a gateway for other devices, and for relaying dynamic host configuration protocol (DHCP) transmissions. In addition, the device includes software for receiving and processing commands from a remote computer system that may include commands enabling and disabling the repeater functionality. Finally, the device also may include software for receiving and processing configuration information that may include, for example, information of the other network devices for which it will repeat.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description of the present invention.

System Architecture and General Design Concepts

Figure 1:
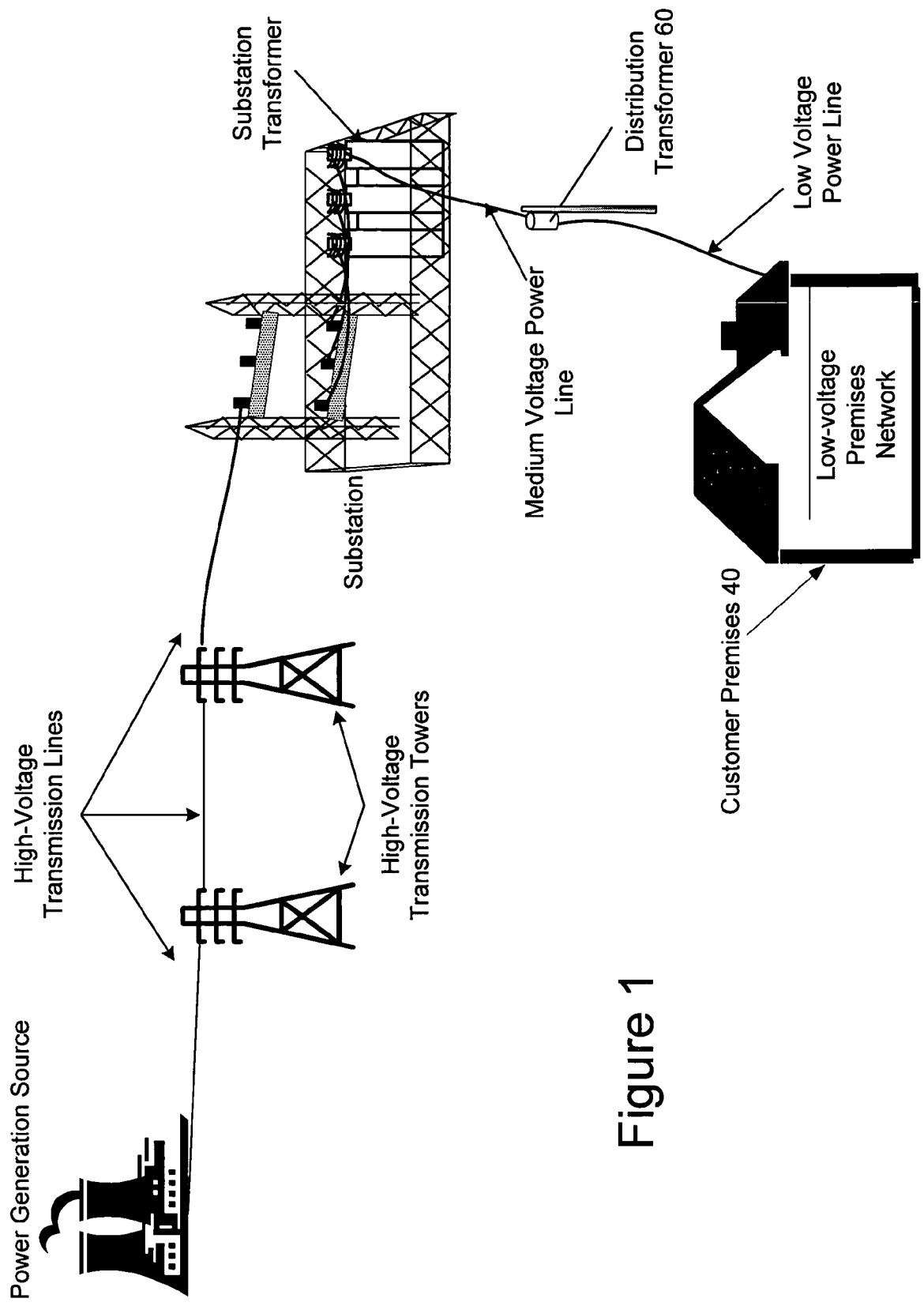
FIG. 1 is a diagram of an exemplary power distribution system with which the present invention may be employed.

As shown in FIG. 1, power distribution systems typically include components for power generation, power transmission, and power delivery. A transmission substation typically is used to increase the voltage from the power generation source to high voltage (HV) levels for long distance transmission on HV transmission lines to a substation. Typical voltages found on HV transmission lines range from 69 kilovolts (kV) to in excess of 800 kV.

In addition to HV transmission lines, power distribution systems include MV power lines and LV power lines. As discussed, MV typically ranges from about 1000 V to about 100 kV and LV typically ranges from about 100 V to about 240 V. Transformers are used to convert between the respective voltage portions, e.g., between the HV section and the MV section and between the MV section and the LV section. Transformers have a primary side for connection to a first voltage (e.g., the MV section) and a secondary side for outputting another (usually lower) voltage (e.g., the LV section). Such transformers are often referred to as distribution transformers or a step down transformers, because they "step down" the voltage to some lower voltage. Transformers, therefore, provide voltage conversion for the power distribution system. Thus, power is carried from substation transformer to a distribution transformer over one or more MV power lines. Power is carried from the distribution transformer to the customer premises via one or more LV power lines.

In addition, a distribution transformer may function to distribute one, two, three, or more phase voltages to the customer premises, depending upon the demands of the user. In the United States, for example, these local distribution transformers typically feed anywhere from one to ten homes, depending upon the concentration of the customer premises in a particular area. Distribution transformers may be pole-top transformers located on a utility pole, pad-mounted transformers located on the ground, or transformers located under ground level.

The communication device of the present invention may form part of a PLCS to communicate signals to and from communication devices at the customer premises through the LV power line. In addition, the communications device of the present invention may facilitate the communication of data signals along the MV power line with 1) other power line communication devices such as bypass devices; 2) one or more backhaul points; 3) one or more power line servers; and/or 4) devices on a network such as the Internet.

Power Line Communication System

Figure 2:
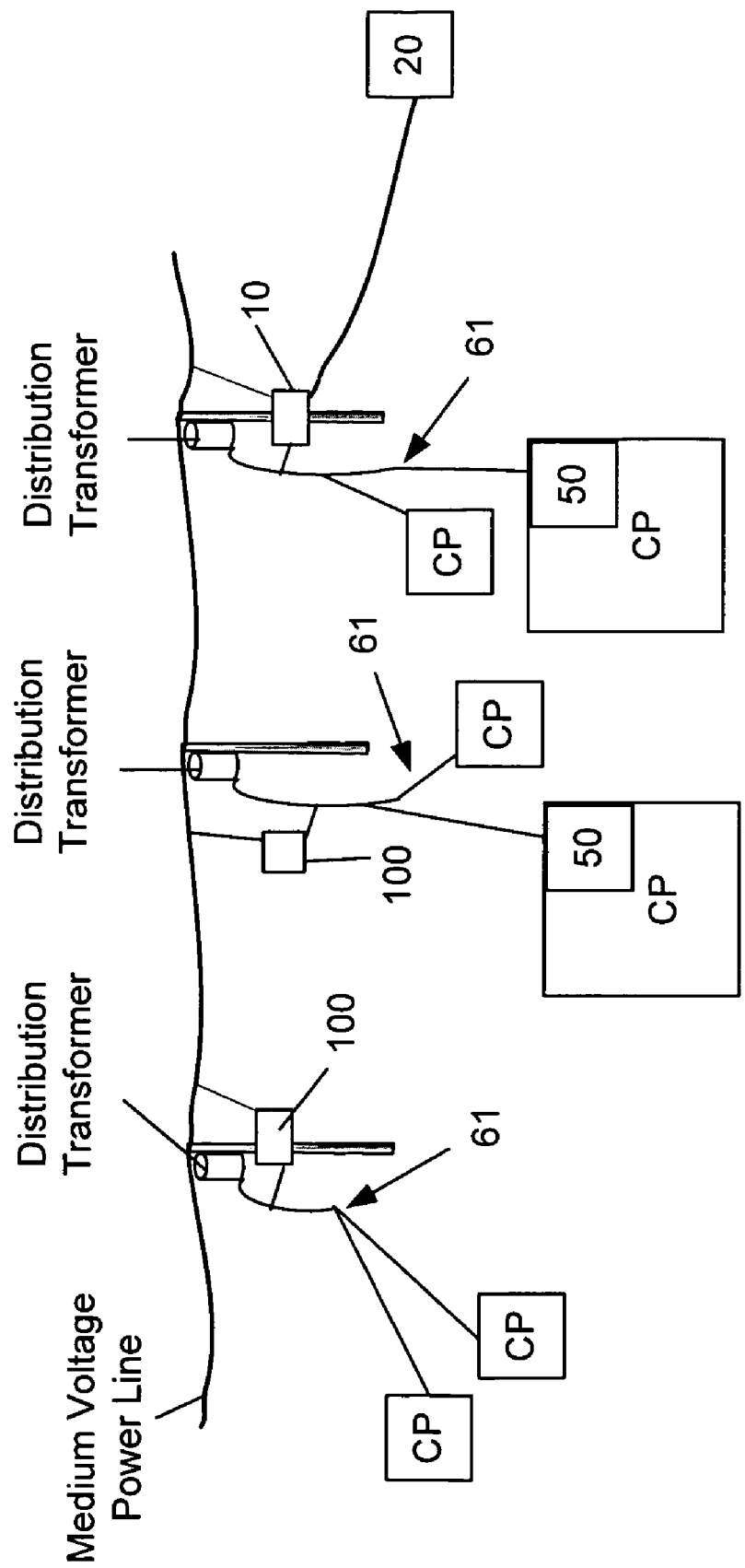
FIG. 2 is a diagram of a portion of an example power line communications system, with which an embodiment of the present invention may be used.

One example of portion of such a PLCS is shown in FIG. 2 and includes one or more bypass devices 100, which may be formed by an embodiment of the present invention. In this example, the present invention is embodied as a bypass device (BD) 100 to communicate data signals around the distribution transformer that would otherwise filter such data signals, preventing them from passing through the transformer or significantly degrading them. Thus, the BD 100 is the gateway between the LV power line subnet (i.e., the devices that are communicatively coupled to the LV power lines) and the MV power line and communicates signals to and from user devices at the customer premises (CP) via the low voltage subnet 61.

In this embodiment, the BD 100 provides communication services for the user, which may include security management, routing of Internet Protocol (IP) packets, filtering data, access control, service level monitoring, signal processing and modulation/demodulation of signals transmitted over the power lines.

This example portion of a PLCS also includes a backhaul point 10, which may also be an alternate embodiment of the present invention. The backhaul point 10 is an interface and gateway between a portion of a PLCS (e.g., an MV run) and a traditional non-power line telecommunications network. One or more backhaul points (BP) 10 are communicatively coupled to an aggregation point (AP) 20 that in many embodiments may be at (e.g., co-located with), or connected to, the point of presence to the Internet. The BP 10 may be connected to the AP 20 using any available mechanism, including fiber optic conductors, T-carrier, Synchronous Optical Network (SONET), or wireless techniques well known to those skilled in the art. Thus, the BP 10 may include a transceiver suited for communicating through the communication medium.

The AP 20 may include a conventional Internet Protocol (IP) data packet router and may be directly connected to an Internet backbone thereby providing access to the Internet. Alternatively, the AP 20 may be connected to a core router (not shown), which provides access to the Internet, or other communication network. Depending on the configuration of the PLCS, a plurality of APs 20 may be connected to a single core router which provides Internet access. The core router (or AP 20 as the case may be) may route voice traffic to and from a voice service provider and route Internet traffic to and from an Internet service provider and/or video provider. The routing of packets to the appropriate provider may be determined by any suitable means such as by including information in the data packets to determine whether a packet is voice. If the packet is voice, the packet may be routed to the voice service provider and, if not, the packet may be routed to the Internet service provider. Similarly, the packet may include information (which may be a portion of the address) to determine whether a packet is Internet data. If the packet is Internet data, the packet may be routed to the Internet service provider and, if not, the packet may be routed to the voice service provider. Additionally, if the packet includes voice, video or other time sensitive data, it may be accorded a higher priority to thereby reduce the latency thereof.

In some PLCS embodiments, there may a distribution point (not shown) between the BP 10 and the AP 20. The distribution point, which include a router, may be coupled to a plurality of BPs 10 and provides routing functions between its BPs 10 and its AP 20. In one example embodiment, a plurality of BPs 10 are connected to each distribution point and each distribution point (of which there are a plurality) is coupled to the AP 20, which provides access to the Internet.

The PLCS also may include a power line server (PLS) that is a computer system with memory for storing a database of information about the PLCS and includes a network element manager (NEM) that monitors and controls the PLCS. The PLS allows network operations personnel to provision users and network equipment, manage customer data, and monitor system status, performance and usage. The PLS may reside at a remote network operations center (NOC), and/or at a PLCS Point of Presence (POP), to oversee a group of communication devices via the Internet. The PLS may provide an Internet identity to the network devices by assigning the devices (e.g., user devices, BDs 100, (e.g., the LV modems and MV modems of BDs), BPs 10, and AP 20) IP addresses and storing the IP addresses and other device identifying information (e.g., the device's location, address, serial number, etc.) in its memory. In addition, the PLS may approve or deny user devices authorization requests, command status reports, statistics and measurements from the BDs, and BPs, and provide application software upgrades to the communication devices (e.g., BDs, BPs, and other devices). The PLS, by collecting electric power distribution information and interfacing with utilities' back-end computer systems may provide enhanced power distribution services such as automated meter reading, outage detection, restoration detection, load balancing, distribution automation, Volt/Volt-Amp Reactance (Volt/VAr) management, and other similar functions. The PLS also may be connected to one or more APs and/or core routers directly or through the Internet and therefore can communicate with any of the BDs, user devices, and BPs through the respective AP and/or core router.

The PLCS may further include indoor low voltage repeaters and outdoor low voltage repeaters. Indoor low voltage repeaters may be plugged into a wall socket inside the customer premises. Outdoor low voltage repeaters may be coupled to the external low voltage power line conductors extending from the transformer and therefore, be located between the customer premises and the BD 100. Both the indoor low voltage repeaters and outdoor low voltage repeaters repeat data on the low voltage power line to extend the communication range of the BD 100 and power line modem.

At the user end of the PLCS of this example system, data flow originates from a user device, which provides the data to a power line modem (PLM) 50, which is well-known in the art.

Various electrical circuits within the customer's premises distribute LV power and data signals within the customer premises. The customer draws power on demand by plugging a device into a power outlet. In a similar manner, the customer may plug the PLM 50 into a power outlet to digitally connect user devices to communicate data signals carried by the LV wiring. The PLM 50 thus serves as an interface for user devices to access the PLCS. The PLM 50 can have a variety of interfaces for customer data appliances. For example, a PLM 50 can include a RJ-11 Plain Old Telephone Service (POTS) connector, an RS-232 connector, a USB connector, a Ethernet 10 Base-T connector, RJ-45 connector, and the like. In this manner, a customer can connect a variety of user devices to the PLCS. Further, multiple PLMs can be plugged into power outlets throughout the customer premises, with each PLM 50 communicating over the same wiring internal of the customer premises to the BD 100.

The user device connected to the PLM 50 may be any device capable of supplying data for transmission (or for receiving such data) including, but not limited to a computer, a telephone, a telephone answering machine, a fax, a digital cable box (e.g., for processing digital audio and video, which may then be supplied to a conventional television and for transmitting requests for video programming), a video game, a stereo, a videophone, a television (which may be a digital television), a video recording device (which may be a digital video recorder), a home network device, a utility meter, or other device. The PLM 50 transmits the data received from the user device through the LV power lines to a BD 100 and provides data received from the LV power line to the user device. The PLM 50 may also be integrated with the user device, which may be a computer. In addition, the functions of the PLM may be integrated into a smart utility meter such as a gas meter, electric meter, water meter, or other utility meter to thereby provide automated meter reading (AMR).

The BD 100 typically transmits the data to (and receives the data from) the backhaul point 10, which, in turn, transmits the data to (and receives the data from) the AP 20. The AP 20 then transmits the data to (and receives the data from) the appropriate destination (perhaps via a core router), which may be a network destination (such as an Internet address) in which case the packets are transmitted to, and pass through, numerous routers (herein routers are meant to include both network routers and switches) in order to arrive at the desired destination.

Figure 3:
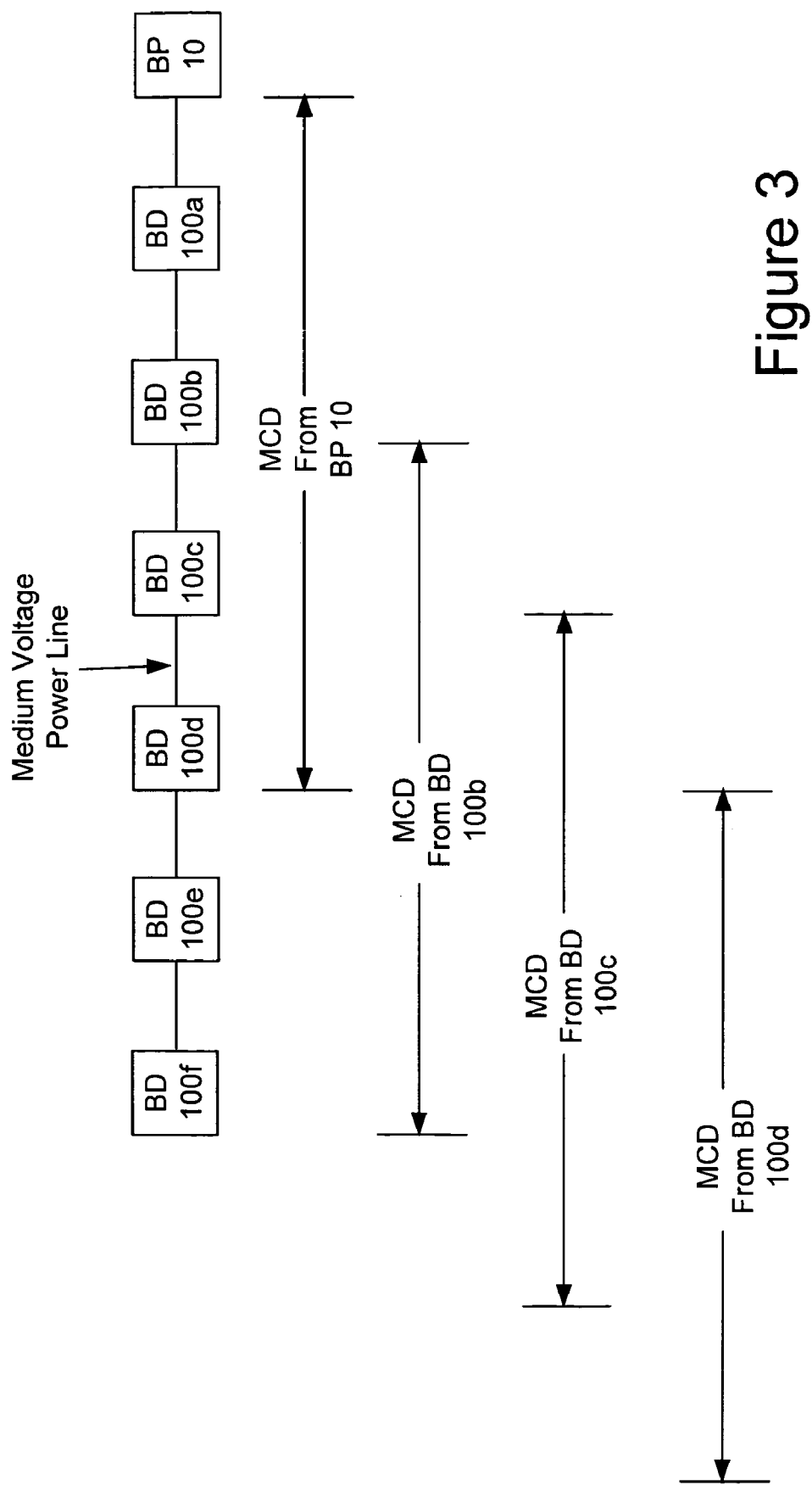
FIG. 3 is a schematic representation of a portion of an exemplary power distribution system in accordance with an embodiment of the present invention.

FIG. 3 provides a schematic representation of a segment of the medium voltage power line of an example portion of a PLCS. As shown, this example includes one BP 10 and six BDs 100a–f. While not shown in FIG. 3, the BP 10 may be communicatively coupled to another set of bypass devices (e.g., on the other side of the BP 10). In addition, the BDs 100a–f may or may not be on the same power line conductor as the BP 10 (because the data signals may cross couple between MV conductors). Communications in this example are point-to-multipoint in that the BP 10 transmits communications signals on the MV power line, which may be received by all of the BDs 100. The communications may include addressed data packets (e.g., internet protocol (IP) data packets). Consequently, while all of the BDs 100 may receive the data packets, only the BD 100 having an address corresponding to the address in the packet processes the packet. Typically, the other BDs 100 will ignore packets not containing their address information. In this example, transmissions from the BDs 100 will include address information of the BP 10, which typically will receive and process the transmissions. While the BDs 100 may receive the transmissions from the other BDs 100, normally they will ignore those transmissions because the packets will not have the address information of the receiving BD 100 (but instead have the address of the BP 10).

Referring to FIG. 3, if the BP 10 and a BD 100 are too far apart (along the MV power line), noise and attenuation over the power line(s) of the communications signals may prevent reliable communications between the two devices. Thus, the PLCS may have a maximum communications distance (MCD) (along the MV power line) over which a BP 10 and a BD 100 may communicate reliably. In addition, this distance may vary from location to location (e.g., from street to street), which makes planning the PLCS network difficult. If, after installation, a communication link between a BD 100 and its BP 10 is unreliable, one option is to install a second BP 10 closer to the BD 100 to service the BD 100. However, installation of BPs can be costly due to costs of installation time, equipment, and the necessity of providing a backhaul link, which may require installing a fiber optic cable or wireless backhaul link.

In addition to the above, due to noise and other factors the communications link between a BD 100 and its BP 10 may be reliable at times and unreliable at other times and/or may become unreliable sometime after installation of the network. Again, one solution is to install a new BP 10 closer to the BD 100 for communications, to service the BD 100. However, as discussed above, this solution is costly. Another solution to the problem is to install a dedicated repeater between the BP 10 and the BD 100. However, typically this requires sending personnel to perform the installation of the repeater (i.e., a truck roll), which can be costly and can take days or weeks to complete during which time the subscriber of the PLCS service may be without reliable service or without any service.

The present invention may reduce the need to install additional BPs, backhaul links, and dedicated repeater devices by extending the reach of existing BPs beyond the MCD through the use of existing network elements.

As an example, the MCD of BP 10 in FIG. 3 is such that it can communicate with BDs 100*a–d*, but can not directly reliably communicate with BD 10*e* or BD 10*f*. The MCD of BDs 100*b–d* are similarly shown. However, BDs 100*b–d* are located such that any of BDs 100*b–d* can directly reliably communicate with BP 10 and both BDs 100*e* and BD 100*f*. One example embodiment of the present invention provides for a BD 100, (such as BD 100*b–d*), to repeat communications for BDs 100*e* and 100*f*, which cannot directly communicate with the BP 10. In addition, it may also be discovered that the BP 10 cannot communicate with other BDs 100 after installation. Thus, the repeater functionality of one example embodiment of the present invention also may be enabled remotely without the need to send personnel (or equipment) to the site.

Example Embodiment

This example embodiment of the present invention includes a BD that also can be configured to repeat communications. The repeating functionality of the device allows the MCD or communications range of a BP 10 to be expanded such that communications devices (e.g., BDs 100) with unsatisfactory connectivity (e.g., due to noise or attenuation of signals) can be improved by repeating to make their connections satisfactory. In addition, the repeater functionality typically will extend the 'reach' of the BP 10 to include communications devices at distances that normally could not be reached by direct transmission between the device and the BP 10. Because the repeating BD 100 reduces the number of BPs 10 needed to be deployed to cover the geographical area of a PLCS, it also reduces the amount of backhaul media (e.g., fiber optic cable or wireless links) that needs to be deployed, thereby providing a significant economic improvement to the PLCS.

In this embodiment, a single device may repeat communications for other devices coupled to the MV power line and also provide communications to one or more user devices (such as those connected to the LV subnet or that are linked to the device via a wireless link). Providing a BD 100 that functions as a bypass device and repeater simultaneously, makes the device even more economically advantageous. For ease of discussion, a BD 100 in which the repeater functionality has been, or is being enabled, generally will be referred to herein as a repeating BD 100 ("RBD 100").

In this embodiment, the repeating BD 100 typically will receive downstream packets addressed to it from a BP 10 and retransmit them on the MV power line for reception by another BD 100. Likewise, the RBD 100 may receive packets addressed to it that are transmitted from one or more BDs 100 and retransmit those packets on the MV power line for reception by the BP 10. Thus, the RBD 100 includes sufficient information stored in its memory (e.g., bridge table or routing table) to receive packets addressed to it, and to re-address those packets with the address of the corresponding destination device (e.g., BP 10 or BD 100). In addition, the demodulation of received packets, and modulation and retransmission of packets improves the signal to noise ratio (SNR) of the data traversing the power line. Thus, the repeater functionality of the BD 100 may extend the communications reach in such a way as to allow devices coupled to the MV power line that cannot communicate with BP 10, to be able to communicate with that BP and operate as a child device of that BP 10.

Furthermore, the repeater functionality may reside in any or all BDs 100, with configuration and activation being remotely enabled and disabled from the PLS automatically or in response to an input from an operator. In addition, more than one BD 100 may be enabled as repeating BDs 100 on a MV run so that data communicated between a BP 10 and a BD 100 may be repeated two or more times. Furthermore, one RBD 100 on an MV run may repeat for some BDs 100 and another RBD 100 may repeat for other BDs 100 on that same run. The flexibility of the functionality may allow the PLS operator (at the network operations center or NOC) to decide where and when to use a repeater without requiring pre-planning or additional hardware deployment and to adapt to changing conditions.

To facilitate on-demand reconfiguration of BDs 100 and BPs 10, the PLS software may include code segments for transmitting commands to 1) enable the repeater functionality of a BD 100, 2) disable repeater functionality of a BD 100, 3) configure a BP 10 to communicate to specific BDs 100 through a specific RBD 100, 4) configure a RBD 100 to repeat for specific BDs 100, and 5) configure specific BDs 100 to route traffic through a specific RBD 100.

The PLS also may store the hierarchical configuration of the BP 10, RBDs 100, BDs 100 for each MV run in the network in its memory (or database) to help facilitate and maintain the desired route configuration. This hierarchy information may include address and other information showing the following for each BP 10: 1) the BDs 100 directly communicating with the BP 10, 2) the BDs 100 directly communicating with the BP 10 and also acting as RBDs 100, 3) the BDs 100 communicating through a RBD 100 and also acting as RBDs 100, and 4) the BDs 100 that are communicating through an RBD 100 (and are not acting as an RBD 100).

As discussed, each BD 100 may include the repeater functionality, which may be enabled or disabled as desired by the operator. In other embodiments, the repeater functionality may be combined with the functionality of other communications devices. For example, in another embodiment the repeating communications device may include a medium voltage port (for communications over the MV power line) and a wireless transceiver for communications to the user devices at the customer premises (e.g., instead of an LV port). Thus, such a bypass device may bypass the transformer without coupling to the LV power line at the transformer. In another example, the repeater functionality may be combined with the backhaul functionality. Consequently, a BP may repeat backhaul communications, such as those from other BPs 10 (or other MV runs) or its BDs 100, over the MV power line using a transmission scheme orthogonal to those between the repeating BP 10 and its child devices (BDs 100). Such a transmission scheme may include one or more of surface wave transmissions, ultra wideband (UWB) transmissions, a different (orthogonal) frequency band, or communicating over the neutral conductor (instead of or in addition to the MV power line conductor). Thus, such a BP 10 (or BD 100, or RBD 100 if also transmitting such signals) may simultaneously communicate (receive or transmit) a conductive signal over the MV power line (e.g., an OFDM signal to or from a BD 100 or RBD 100) and a UWB signal or surface wave signal (e.g., for backhaul communications to or from a RBD 100 or BP 10). Such a BP 10, therefore, may not need to have a separate backhaul link connection. The non-power line backhaul link may be connected to the upstream BP 10 or other device receiving the repeated data. Thus, such RBDs 100 and BPs 10 may include a first MV interface for communications via OFDM (e.g., for communications between devices of the same MV run) and a second MV interface for UWB communications, surface wave communications, or communications in a second frequency band (e.g., for communications being repeated from (or to) other BPs 10 of other MV runs). The first and second MV interface may share some components such as, for example, the MV coupler. Thus, the MV may be used to provide two or more simultaneously available communications channels.

The embodiment described below includes a BD 100 that operates as BD 100 for bypassing a pole-mounted transformer. The present invention may be equally applicable for use in bypassing other types of transformers (such as pad mount or underground). The BD 100 may provide a path for data to bypass the transformer by being coupled to the same MV power line conductor to which the transformer is coupled or to a different MV power line conductor and, in either instance, may be coupled to the same LV power lines to which the bypassed transformer is coupled. In addition, the BDs 100 may or may not be physically coupled to the same power line conductor to which the BP 10 is physically connected. For example, in overhead PLCS, high frequency data signals may cross-couple between the power line conductors.

Hardware

Figure 4:
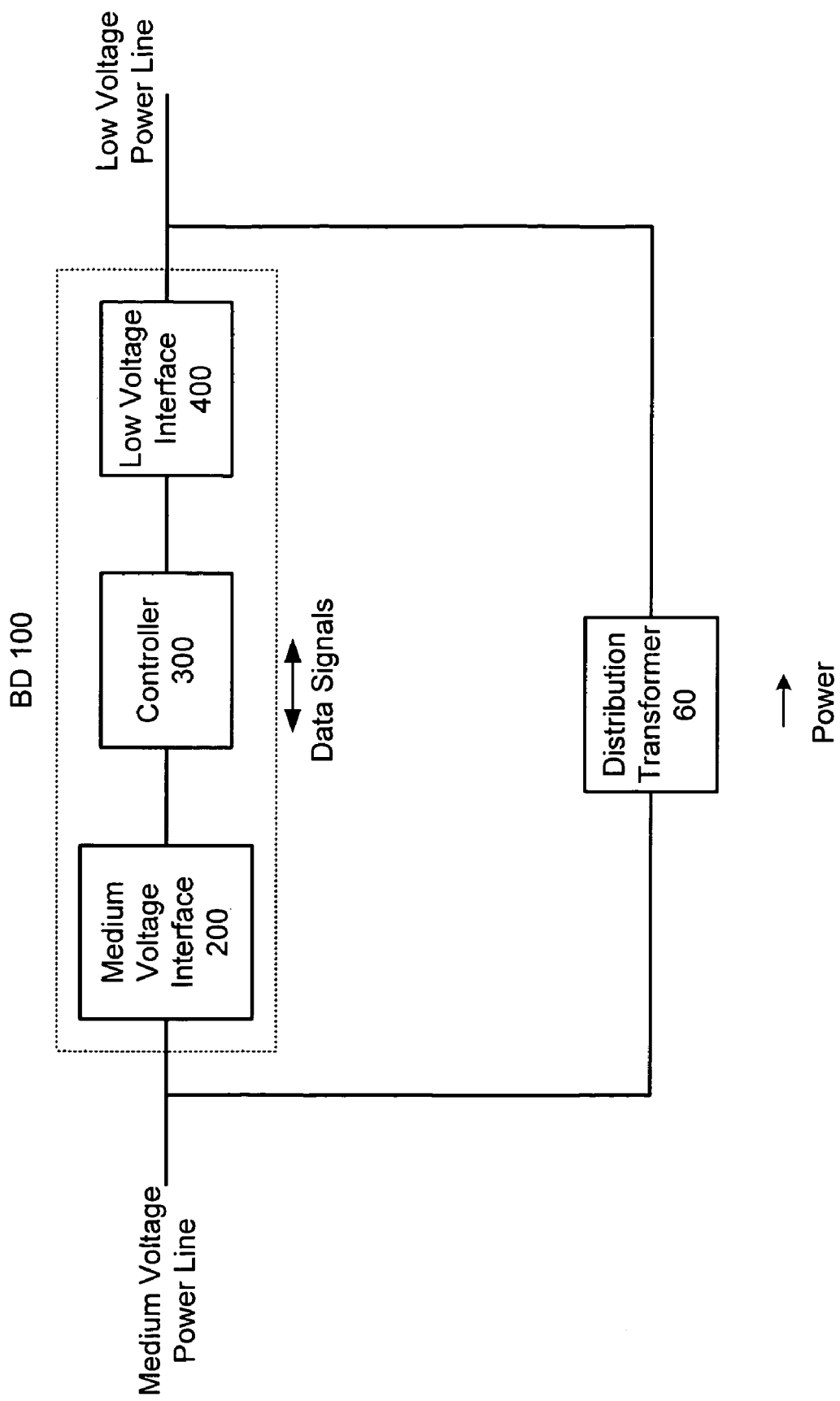
FIG. 4 is a block diagram of a bypass device, in accordance with an embodiment of the present invention.

The BD 100 described herein, which is an example embodiment of the present invention, provides bi-directional communications and includes the functional block diagrams shown in FIG. 4. In particular, this embodiment of the BD 100 includes a MV power line interface (MVI) 200, a controller 300, and a LV power line interface (LVI) 400. Both the MVI and LVI may include an adaptive and/or dynamic transmitter to transmit signals at various power levels as determined by the controller 300, which may change the output power in response to a command from the PLS or automatically due to changes in line impedance. The BD 100 is controlled by a programmable processor and associated peripheral circuitry, which form part of the controller 300. The controller 300 includes memory that stores, among other things, routing information and program code, which controls the operation of the processor.

Figure 5:
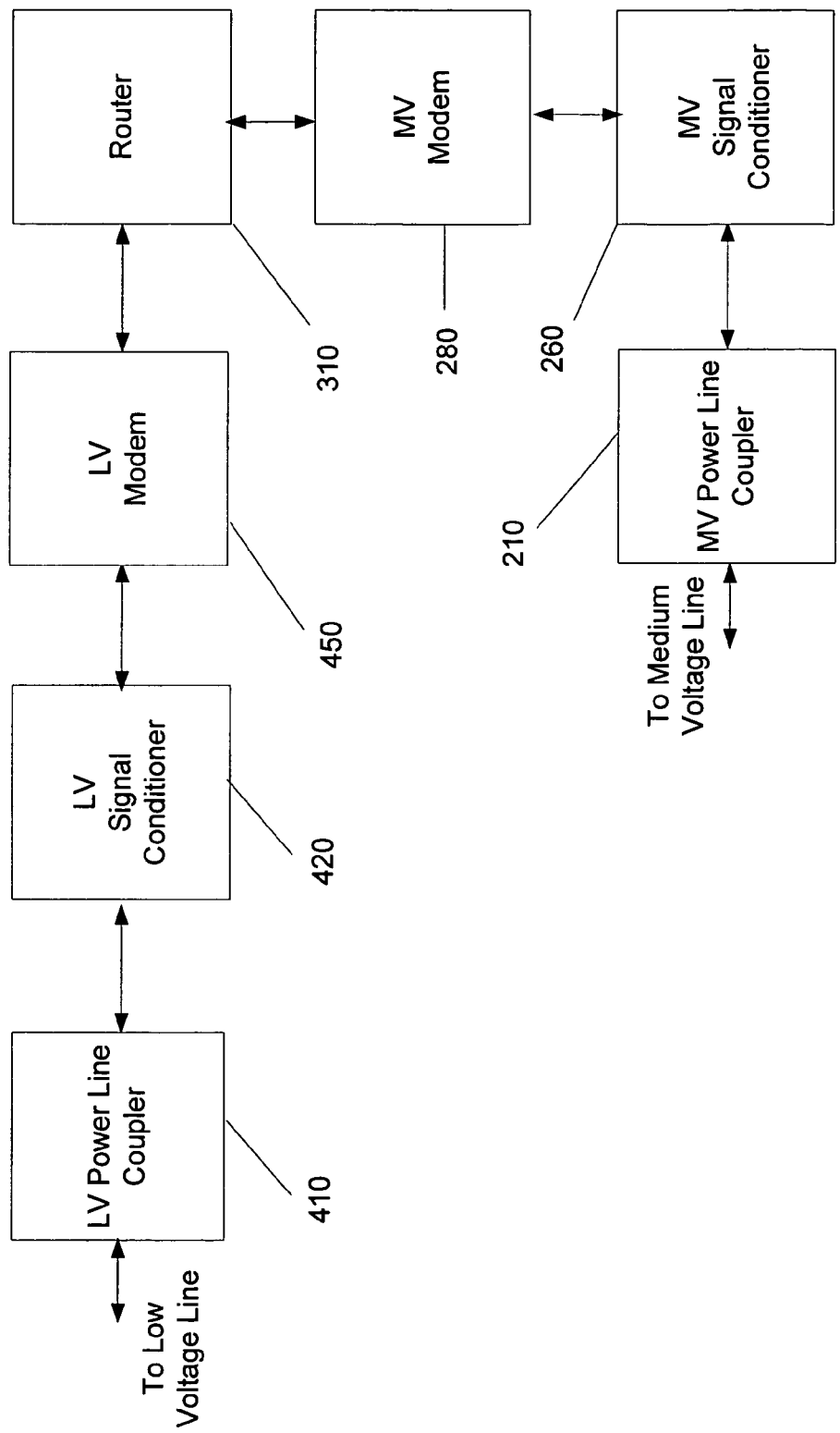
FIG. 5 is a block diagram of a bypass device, in accordance with an embodiment of the present invention.

Referring to FIG. 5, the LVI 400 may include a LV power line coupler 410, a LV signal conditioner 420, and a LV modem 450. The router 310 forms part of the controller 300 and performs routing functions. Router 310 may perform routing functions using layer 3 data (e.g., IP addresses), layer 2 data (e.g., MAC addresses), or a combination of layer 2 and layer 3 data (e.g., a combination of MAC and IP addresses). The MVI 200 may include a MV modem 280, a MV signal conditioner 260, and a power line coupler 210. In addition to routing, the controller 300 may perform other functions including controlling the operation of the LVI 400 and MVI 200 functional components and responding to PLS commands and requests. A more complete description of the hardware, firmware, of the BD 100 and its functionality is described below.

This embodiment of the BD 100 provides bi-directional communications around the distribution transformer to thereby provide a first communications path from the LV power line to the MV power line and a second path from the MV power line to the LV power line. Thus, BD 100 can receive and transmit data to one or more user devices in one or more customer premises via the LVI 400, which may be connected to a plurality customer premises via a plurality of LV power lines. In addition, the BD 100 may receive and transmit data with other network elements, such as one or more the BPs 10 and other BDs 100, via the MVI 300.

Auto-Provision and Activation of Network Components

While skilled in working with power lines, personnel installing the BDs 100, who typically are utility linemen, often have little or no experience in working with communications networks. Consequently, it is desirable to have a system that permits easy installation of the BDs 100 without the need to perform network configuration or other network installation procedures. Upon being physically installed and powered up, the BD 100 typically will not immediately be part of the PLCS network in that, among other things, it does not have an IP address assigned to it, the address of an upstream gateway, user device information, and has not been activated. "Auto-Provisioning" is the term used to refer to the procedure performed to get a new network element (e.g., a BD 100, or BP 10) onto the PLCS network by providing such information and activation.

In the present example embodiment, each network element includes a unique identifier, which may be a serial number. In this embodiment, the enclosure of the BD 100 has a barcode that the installer may scan to record the serial number. The installer also may record the location (e.g., transformer or pole number) of the installed device. This information (the identifying information and location) is provided to a network administrator for input into the PLS for storage. Alternately, the installer may wirelessly transmit the information to the PLS for reception and storage by the PLS.

Gateway Negotiation Protocol

After initial installation and power up of the BD 100, the BD 100 may implement the Gateway Negotiation Protocol (GNP), which provides a method for the BD 100 (which may not yet have an IP address) to discover gateways on the MV power line (e.g., the address to be used for upstream communications).

In this embodiment, the GNP is a layer two protocol, but other embodiments may additionally, or instead, use other layers (e.g., layer three). For a previously unactivated and unconfigured BD 100, the GNP sets a pathway for initiating dynamic host configuration protocol (DHCP) negotiation with its BP 10 and to eventually get its Activation from the PLS. This pathway includes an upstream gateway to which the BD 100 "attaches", meaning that the BD 100 typically will use the gateway for future upstream communications unless it is specifically instructed otherwise or reboots and acquires a different gateway address via GNP.

The GNP provides gateway information that may include information of the address of the device to be used by the BD 100 for communicating with its DHCP server, which in this embodiment may be the address of its BP 10 or the address of a repeating BD (RBD) 100. In addition, the GNP may provide the information of the address of the DHCP server itself, which typically will be the address of a BP 10 in this embodiment. Thus, GNP provides a method to discover the IP address (layer 3) of the Gateway device along with a MAC address (layer 2) of the upstream device (e.g., an RBD 100 or BP 10).

The GNP includes four types of messages: Solicit, Advertise, Attach, Acknowledged/Not-Acknowledged (ACK/NACK). BDs 100 may transmit Solicit and Attach messages. Gateway devices such as RBDs 100 and BPs 10 may transmit Advertise and ACK/NACK messages.

Figure 6:
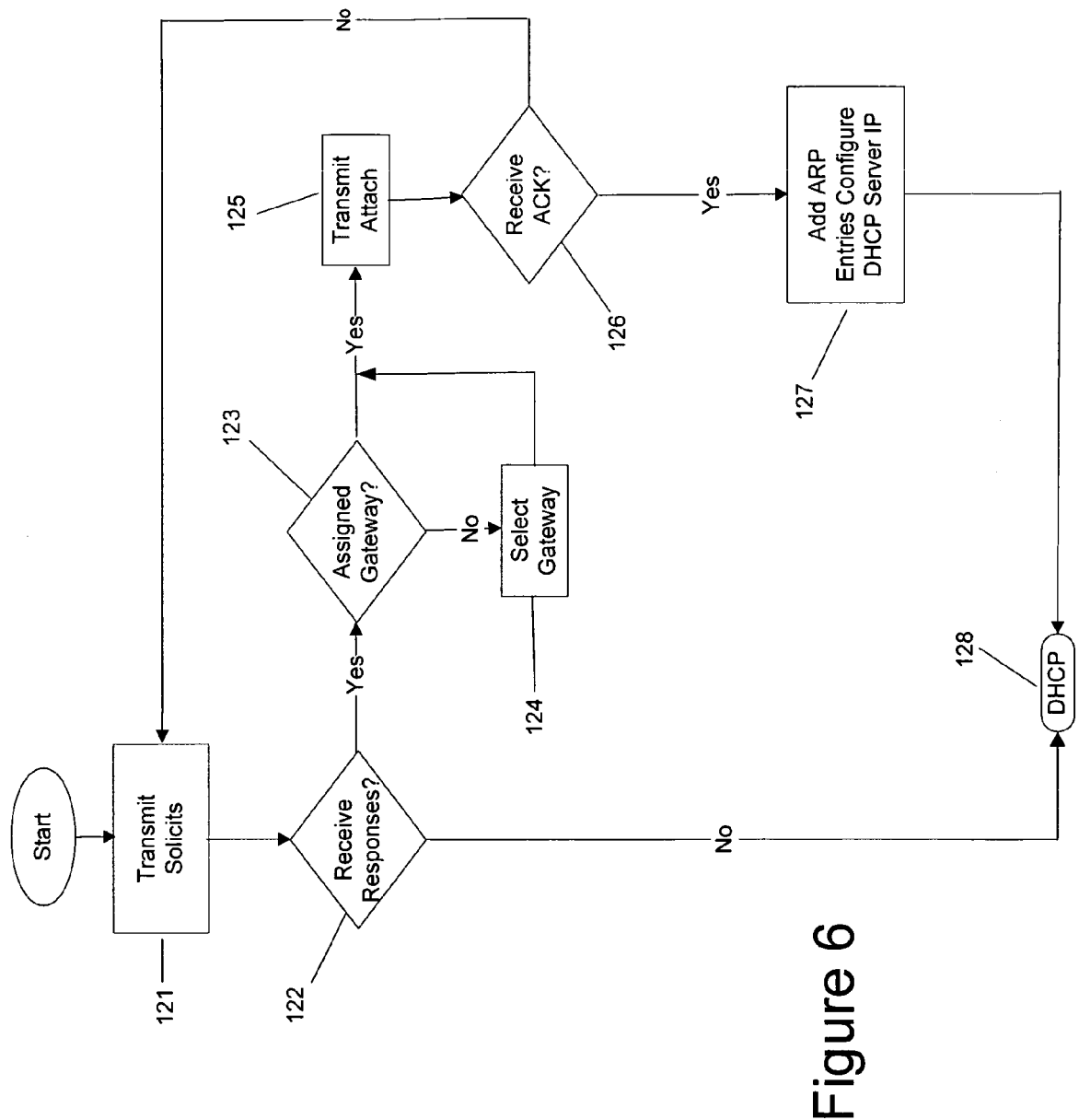
FIG. 6 is a flow chart of a portion of the software in an example embodiment according to the present invention.
Figure 7:
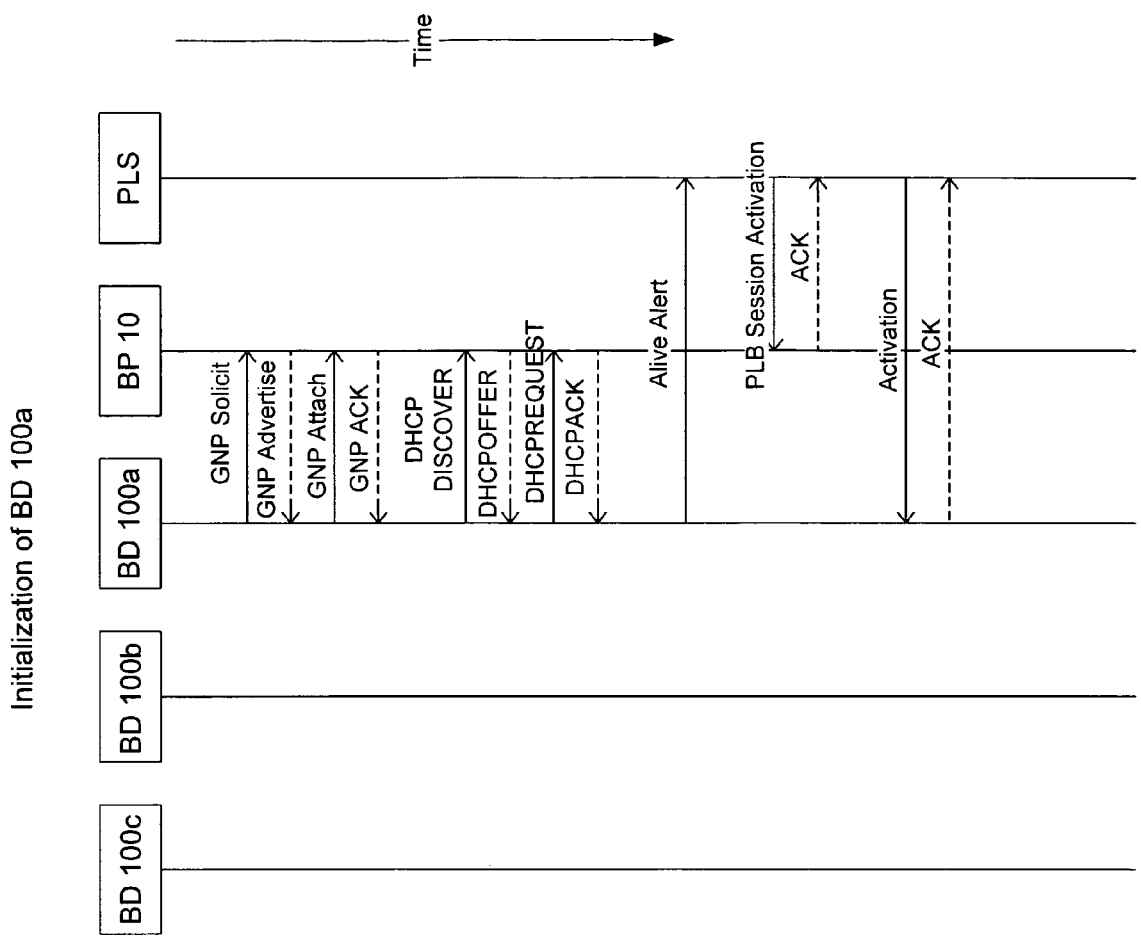
FIG. 7 is a timeline of a portion of the communications for initializing a network element in an example embodiment of the present invention.
Figure 8:
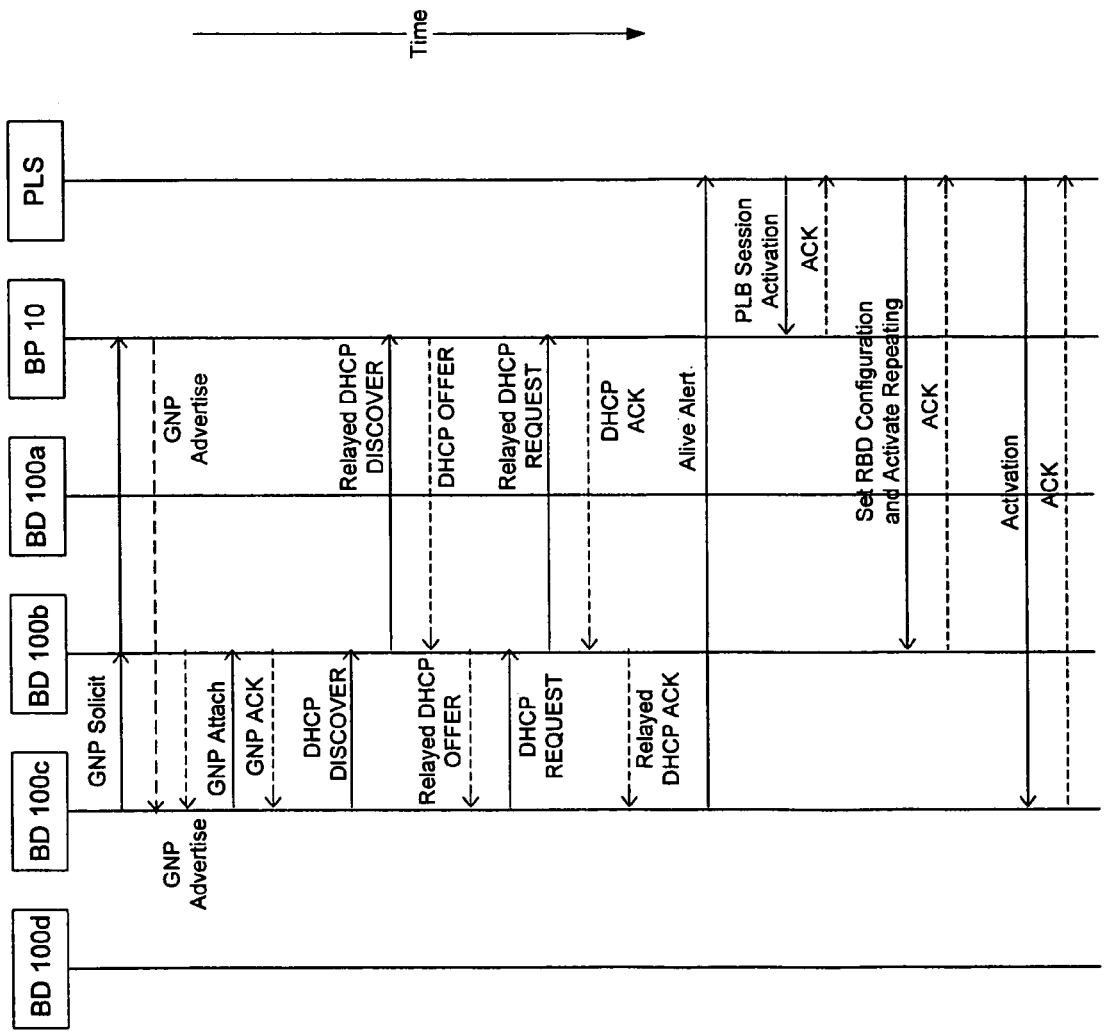
FIG. 8 is a timeline of a portion of the communications for initializing a network element device in an example embodiment of the present invention.

Referring to the flowchart of FIG. 6 and illustrations of FIGS. 7 and 8, at power up, a BD 100 may broadcast a Solicit message (step 121 in FIG. 6), which indicates that the BD 100 is searching for a gateway device for DHCP negotiations and/or for communications. In response to the Solicit message, those gateway devices (RBDs 100 and BPs 10) that receive and decrypt the Solicit message may respond by transmitting an Advertise message, which indicates their availability as a gateway. The Advertise message may include a Link Figure of Merit (LFoM) (which may be based on bytes 40 information) and a gateway flag. In some instances, the PLS may assign a BD 100 an upstream gateway. When the gateway flag is set in the Advertise message, it indicates that the responding device (the device transmitting the Advertise message) has been designated the gateway device (e.g., by the PLS) for the BD 100 transmitting the Solicit message. The LFoM information in the Advertise message includes data relating to the quality of the communications link between the devices and may include bit error rate (BER) information or information derived from the BER. As shown in FIG. 6, the response is received and processed by the BD 100. If the Advertise message indicates the responding device is an assigned gateway (i.e., the gateway flag in the message is set), the BD 100 may transmit an Attach message at step 125, subsequently receive an ACK at step 126, and then update its configuration information at step 127, and proceed to DHCP at step 128.

If there are no responses with the gateway flag set, the initializing BD 100 may transmit multiple Solicit messages before attaching to a responding gateway (e.g., a RBD 100 or BP 10). The multiple Solicit messages typically will increase the chances that the BD 100 will discover its most reliable temporary gateway. In addition, the multiple GNP Solicit messages may allow the BD 100 to collect multiple LFoM samples from each responding potential gateway device. The BD 100 may average the LFoM data from the responding gateway devices to determine the most reliable temporary gateway.

A device that has been designated as the assigned gateway (e.g., by the PLS) will include an assigned gateway flag in its Advertise message (in response to the Solicit message). If an assigned gateway responds to the Solicit message, a BD 100 typically will attach to it, regardless of the NE Type and LFoM of other responding gateways. In the event that two or more gateways indicate that they are the assigned Gateway, the BD 100 may attach to the first gateway responding with the assigned Gateway flag set—or, in an alternate embodiment, to the gateway device with best LFoM data.

In this embodiment, if the BD 100 fails to receive a response from an assigned gateway it will base attachment on the network element (NE) type (i.e., RBD 100 or BP 10) and LFoM data for each responding gateway device. Thus, at step 124 a BD 100 may select the gateway by scoring each gateway responding to its Solicit message. This score may be related to the quality of the link between the BD 100 and the responding gateway device and, as an example, may be related to the average LFoM data.

However, in general the score must meet or exceed the LFoM threshold value for the device type. The LFoM threshold value may include a minimum LFoM value for BPs 10 and a separate minimum LFoM value for RBDs 100, both of which may be transmitted from the PLS (and stored in memory) or pre-configured in memory of the BD 100. Thus, the operator may provide an input to the PLS to cause the software of the PLS to transmit the BP 10 LFoM and BD 100 LFoM thresholds for one or more BDs for use in GNP gateway device selection.

Thus, the BD 100 may include a software segment for receiving and processing LFoM threshold information transmitted from the PLS. In addition to threshold information transmitted from the PLS, the BD 100 may have default minimum threshold values for the BP 10 and RBD LFoM used in BD 100 gateway selections during GNP negotiations stored in memory.

As discussed, the controller of the BD 100 may implement an algorithm for weighted selection of its gateway during GNP negotiations. First, in this example algorithm, Advertise messages with a LFoM value from a BP 10 that meet or exceed the BP LFoM threshold are selected above a RBD 100, whether or not the with LFoM information from that RBD 100 meets or exceeds the RBD 100 LFoM threshold or that of the assigned BP 10. Second, Advertise messages with a LFoM value from an RBD 100 that meets or exceeds the RBD 100 LFoM threshold may be selected above a BP 10 whose LFoM value does not meet or exceed the BP 10 LFoM threshold.

The selection between devices of the same NE types (e.g., two or more BDs 100 or BPs 10) is given to the device with the higher LFoM value. For example, if the choice is between two BPs 10, the BP 10 with the higher LFoM value typically will be selected. Similarly, if there were no BP 10 Advertise messages with LFoM data above the BP LFoM threshold and the choice is between RBDs 100, the RBD 100 with the higher LFoM value typically will be selected (provided at least one had a LFoM value above the RBD 100 LFoM threshold).

Once the BD 100 determines its upstream gateway, it transmits an Attach message to that gateway device at step 125. In response to receiving the Attach message, the gateway device typically will respond with an Acknowledge message, which is received by the BD 100 at step 126.

Upon receiving the GNP ACK at step 126, a BD 100 typically will also configure its DHCP client with the Gateway IP Address at step 127. As discussed, the Gateway IP may be a layer 3 address used to route all traffic being sent to an upstream network. The next upstream hop MAC address may be a layer 2 address used to reach that Gateway IP address. Static ARP may be used to set this binding so that the BD 100 knows how to communicate with a foreign subnet correctly. Consequently, the BD 100 may make the following ARP entries (store in memory) upon receiving an Acknowledge message from its gateway device:
   Gateway IP-> Upstream Gateway MAC address
   DHCP Server IP-> Upstream Gateway MAC address
   The DHCP client of the BD 100 will use this address as the address for communications with its DHCP server at step 128.

In the event that no gateways respond to the Solicit message, a BD 100 may then attempt DHCP request at step 128. In this situation, DHCP messages will be broadcast. The BD 100 may reattempt GNP negotiations if the DHCP attempt fails.

Each GNP message typically will include much of the following information:
   Protocol Version
   Message Type (Solicit, Advertise, Attach, or ACK/NACK)
   NE Type of transmitting device (BD 100, RBD 100, or BP 10)
   LFoM (related to link quality)
   Assigned Gateway Flag (in the Advertise message indicating the responding device is the assigned gateway)
   BD 100 north bound (NB) MAC Address (i.e., MAC address of the MV modem of the initializing device)
   Gateway IP Address (from the gateway device)
   Upstream Gateway MAC Address (of MV Modem from the upstream device)
   DHCP Server IP (typically a south bound ("SB") BP IP address or BP MV modem IP address)

The following is an example of the information received via an example GNP by an initializing BD 100, a RBD 100, and a BP 10. The relationship between these example devices is as follows:
   BP 10 has a DHCP Server and its SB (MV modem) IP address is 10.1.1.1;
   RBD 100 has repeat enabled and its NB (MV modem) IP address is 10.1.1.2; and
   BD 100 has NB (MV modem) IP address of 10.1.1.3 and serves SB (LV) subnet 10.2.2.x.

In order to communicate with BD 100 (either IP address 10.1.1.3 or subnet 10.2.2.x) BP 10 must have data indicating that it must communicate through RBD 100's NB interface. Consequently, BP 10 may receive configuration data that specifies the RBD 100's NB MAC address (MV modem MAC address) in a static ARP that binds 10.1.1.3 and 10.2.2.x subnet to the RBD 100 NB MAC address.

RBD 100 needs to know that it repeats for 10.1.1.3 and foreign LV subnet 10.2.2.x. Thus, RBD 100's configuration data specifies static ARP that binds 10.1.1.3 and 10.2.2.x to BD 100's NB interface MAC address.

BD 100 needs to know that its DHCP server is as 10.1.1.1 and its Gateway IP address is 10.1.1.2, but its DHCP Server and gateway next hop MAC address is that of RBD 100 NB interface. Thus, the GNP results in a static ARP entry binding 10.1.1.1 and 10.1.1.2 to the RBD 100 NB MAC address.

DHCP

Once the data pathway is set via the GNP, the BD 100 may communicate with its DHCP server (e.g., BP 10). Typically, the BD 100 will transmit a request, such as a DHCP request, to the BP 10 designated by the gateway information. If the BD's gateway is an RBD 100, the BD 100 will communicate with its BP 10 via the RBD 100. If the BD's gateway is a BP 10, the BD 100 will communicate with the BP 10 directly.

In response to the DHCP request, the BP 10 may assign the requested information to the MV interface (e.g., assigns an IP address to be associated with the MV modem 280 of the BD 100), and the MV subnet mask and transmits the information to the BD 100. In addition, the BP 10 may transmit the IP address of the BP 10 to be used as the BD's network gateway address (if necessary), and the IP address for the PLS. The BD 100 receives the information from the BP 10 and stores it in its non-volatile memory.

After receiving and storing the DHCP information, the BD 100 then transmits an Alive Alert to the PLS (using the IP address received during the DHCP negotiation via the gateway negotiated during GNP) indicating that the BD 100 is operating and connected to the network. The Alive Alert may include information identifying the BD 100, configurations of the BD 100 (e.g., MAC addresses of the LV modem 450 and MV modem 280), the IP address of the MV Interface (i.e., the IP address assigned to the MV modem 280 received from the BP 10), MV subnet mask for use by the BD MV interface (much of which was received from the BP 10), and the Gateway IP address. This information is stored by the PLS in the network elements database.

In response, the PLS may activate the BD 100 by transmitting an activation command and assigning and transmitting to the BD 100 a LV subnet mask and a LV Interface IP address (i.e., the IP address used to communicate with the LV modem 450). In addition, the gateway IP address of the BD 100 (as determined by the GNP) can be modified by the PLS to set the assigned gateway of the BD 100 to a different gateway device (and associated addresses). If this is done, the newly assigned gateway device is informed of the selection so that subsequent GNP negotiations with that BD 100 will include responses with the gateway flag set. If there are customers present on the LV subnet, the PLS also may transmit customer information to the BD 100, which may include such information as data filtering information, keys (e.g., network encryption keys) for the user devices, user device IP addresses, and subscription levels for the various users and/or user devices. In addition, the PLS may configure the BD 100 by transmitting DNS addresses (e.g., a first and second DNS address), and a registration server IP address or URL. This information is stored by the PLS (in the network elements database) and the BD 100. As discussed below, until a user device is registered with the PLCS operator, the BD 100 may be programmed to allow the user device to access only the domain name servers and registration server. After receiving the activation command, the BD 100 may transmit an activation acknowledgement to the PLS, indicating that it is Online and can communicate user data. The activation acknowledgment may be stored in the PLS database indicating that the BD 100 is Online.

Another feature included in the repeater functionality is operation as a DHCP relay for repeated devices. Because devices that need their traffic repeated may not be able to directly communicate with the BP 10 to perform DHCP negotiation, the RBD 100 may act as a relay for all DHCP messaging between the repeated BD 100 and the DHCP Server. In this embodiment, this DHCP relay functionality may be performed only for devices that have fully negotiated the RBD 100 as their gateway during GNP negotiations.

The following illustrates one example of DHCP negotiation via a RBD 100 acting as a DHCP relay for an initializing device, much of which is depicted in FIG. 8. First, the initializing BD 100c device may perform the GNP negotiation to obtain information of the IP address of the DHCP Server (i.e., the IP address of the BP 10) for the MV link. In this example, RBD 100b is selected as the gateway device. Second, the device may establish a static ARP mapping the BP's IP address to the MAC address of the device's gateway (RBD 110b). Next, the device's DHCP client may send unicast messages (i.e., addressed messages) to the DHCP relay agent on the MV link. The RBD 100*b* will inspect these messages and determine that the source of the message is a device for which it is repeating, will add the appropriate DHCP relay information, and retransmit the modified unicast message back onto the MV link. The BP's DHCP Server may receive the modified DHCP unicast message, process it and transmit DHCP responses as unicast messages by way of the gateway address of the RBD 100*b* in the DHCP message. The RBD 100*b* will inspect the DHCP response unicast messages and retransmit the modified DHCP response as a unicast message to the BD 100*c* on the MV link. BD 100*c* will receive the DHCP response and will process the response message accordingly.

Normally the unreliable nature of the MV link connections causes problems due to messages not being received by the intended target. However, for this case, where DHCP messages are being repeated by the RBD 100, the unreliable nature potentially has the opposite affect in that messages could arrive from both the originator (BP 10) and the RBD 100. By using unicast messages (e.g., addressed messages) between the initializing device (BD 100*c*) and the RBD 100, using the MAC address of the RBD 100*b* as the hop, the issue of multiple retransmitted messages is avoided and the RBD 100*b* accounts for the unreliable transmission.

In some embodiments, the BD 100 may store and set static routes (IP addresses of the devices) and Address Resolution Protocol (ARP) information. In such embodiments, it may be desirable to disable Internet Control Message Protocol (ICMP) redirects in both the BDs 100 (e.g., RBDs 100) and the BP 10. The disabling of the ICMP redirects will cause those devices not to indicate to the source (transmitting) device that there is a more direct path to the destination (addressed) device. If ICMP redirect were not disabled in a RBD 100, the RBD 100 might send a redirect message back to the transmitting device indicating it should go directly to the BP 10 and redirection would be done each time regardless as to whether or not the device could see the BP 10 directly (i.e., communicate with the BP 10 without the data being repeated by the RBD 100). However, such an occurrence is not desirable and contradicts the point of enabling the RBD 100 to repeat communications between the BP 10 and the BD 100.

The RBD 100 also repeats pings to, from and through the BD 100 with respect to the BD's LV modem, MV modem, and foreign subnets, including to/from customer devices, the BP 10, or test machines within the PLCS network.

The RBD 100 also may repeat TTCP traffic to, from, and through the BD 100 with respect to the BD 100 LV, MV and foreign subnets, including to/from customer devices, the BP 10, and/or test devices within the PLCS network.

Reconfiguring BDs

As discussed above, it may be helpful to configure a BD 100 that is acting solely as a bypass device to also repeat for other BDs 100. As discussed, in some instances it may be desirable to enable the repeater functionality in two or more BDs to further extend communications of the BP 10. In addition, if a communication link improves or is determined to be better than anticipated, it may be desirable to configure the system so that a BD 100 that communicates through a RBD 100, instead communicates directly with its BP 10. Thus, this example embodiment of the PLCS and BDs 100 includes the ability to enable or disable the repeating functionality within any BD 100 from the PLS operator console. The enablement and disablement of the repeater functionality in the BDs 100, and the configuration of the other network elements may be performed by the PLS in response to user inputs from the NOC operator, NOC interfaces and/or automatically. In addition, the PLS may change a BD 100 currently repeated by one RBD 100 to be repeated by a different RBD 100.

Part of enabling repeater functionality within a BD 100 may include the configuration of other BDs 100 for which it will repeat. The PLS allows the NOC operator to select which BD 100 on an MV run to enable repeater functionality. The PLS may also provide an option to the NOC operator to identify the devices for which the RBD 100 should repeat, out of the list of alive or activated devices on that MV run. Alternately, this may be performed automatically by the PLS via software code segment executed on the PLS. This identification may be based on the quality of the existing communication links for those devices, which may be based on LFoM information transmitted to the PLS.

This configuration (of other BDs 100) may be optional at the time the repeater function is enabled because the devices for which the RBD 100 is to repeat may not be known (or installed) at the time of enablement. The PLS may determine and transmit both IP and MAC address information needed by the RBD 100 to ensure the proper repeating of both traffic from the repeated devices to/from a subnet foreign to the MV link and traffic between the repeated devices MV interface to/from the BP 10 and foreign subnets beyond the BP 10.

In addition to the RBD 100 receiving repeated device configuration information, the PLS may also transmit to the BP 10 information identifying a RBD 100 as repeating for other of the BP's devices. The repeated device configuration provides information identifying the next hop for traffic coming from a foreign subnet down to either the repeated BDs 100 MV interfaces or the repeated BDs 100 LV subnets. The BP 10 also uses this information to determine what the next hop is for traffic directed from the BP 10 to the repeated devices (e.g., what RBD 100 is the gateway for the BD 100).

The BD 100 receives and stores the configuration information (e.g., transmitted from the PLS) in memory, which may include, but is not limited to, the repeater function Enable/Disable Status; the repeated BD MV interface ARP information (e.g., address information for the MV modems of the repeated BDs 100); and the repeated BD southbound (i.e., downstream) interface Route information. The route information may include the subnet routes and the BD 100 NB MAC address for ARP binding in the RBD 100. In this embodiment, once a BD 100 has been configured to communicate via a RBD 100, it will always use that RBD 100 for communications to the BP 10 while this configuration is in effect and the device has not rebooted.

Figure 9:
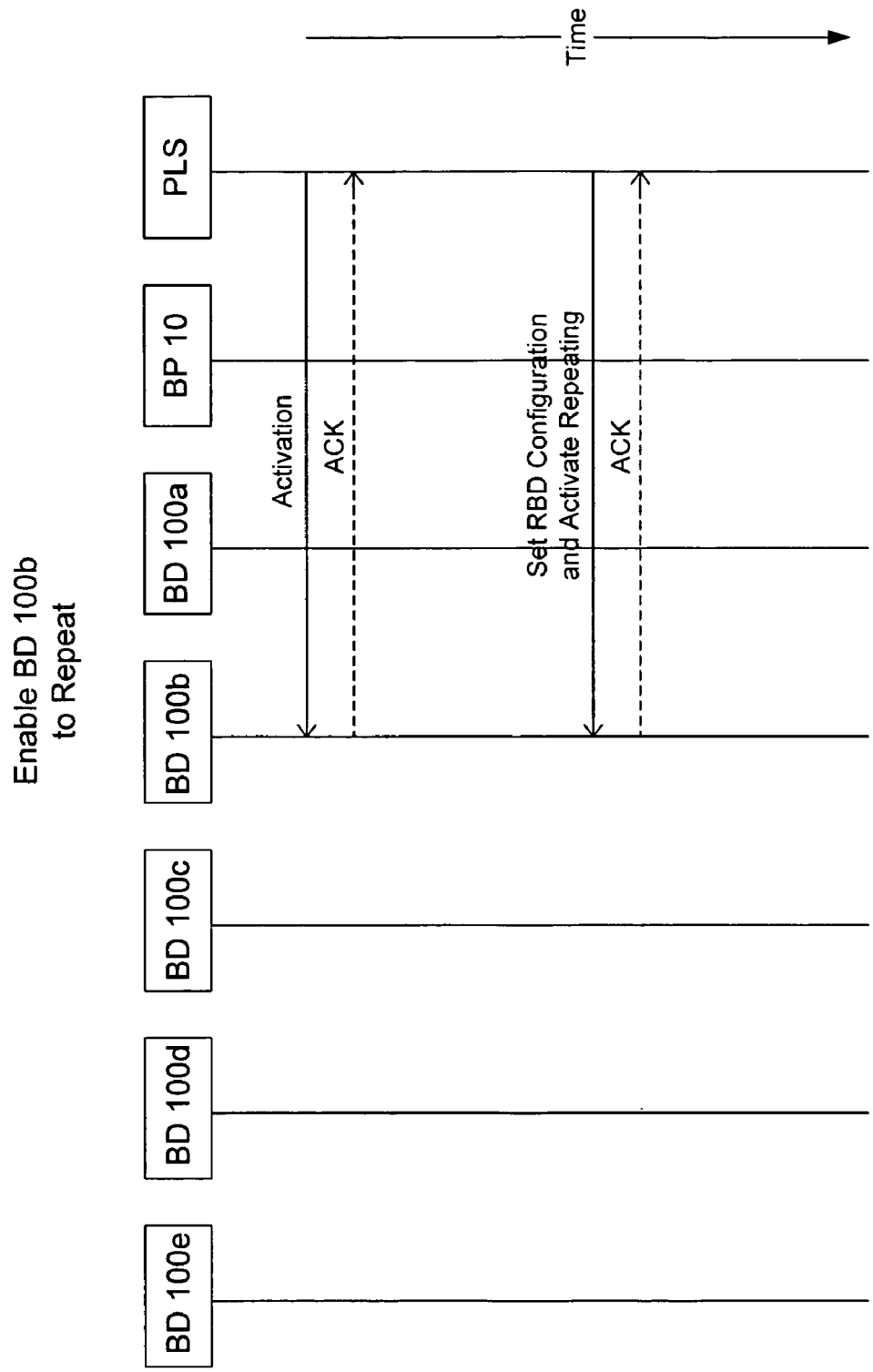
FIG. 9 is a timeline of a portion of the communications for enabling the repeater functionality in a network element device in an example embodiment of the present invention.

FIG. 9 depicts an example of some of the communications employed to enable the repeater functionality. Specifically, in this schematic representation BD 100*b* is being enabled as a repeater sometime after activation. As shown, BD 100*b* is enabled as a repeater and provided with new configuration information. BD 100*b* may then respond as a potential gateway device to other BDs 100, such as BDs 100*c–d*, (as well as 100*a* and 100*e*, although they may not choose to select 100*b* as their gateway) that initialize thereafter and transmit Solicit messages.

Figure 10:
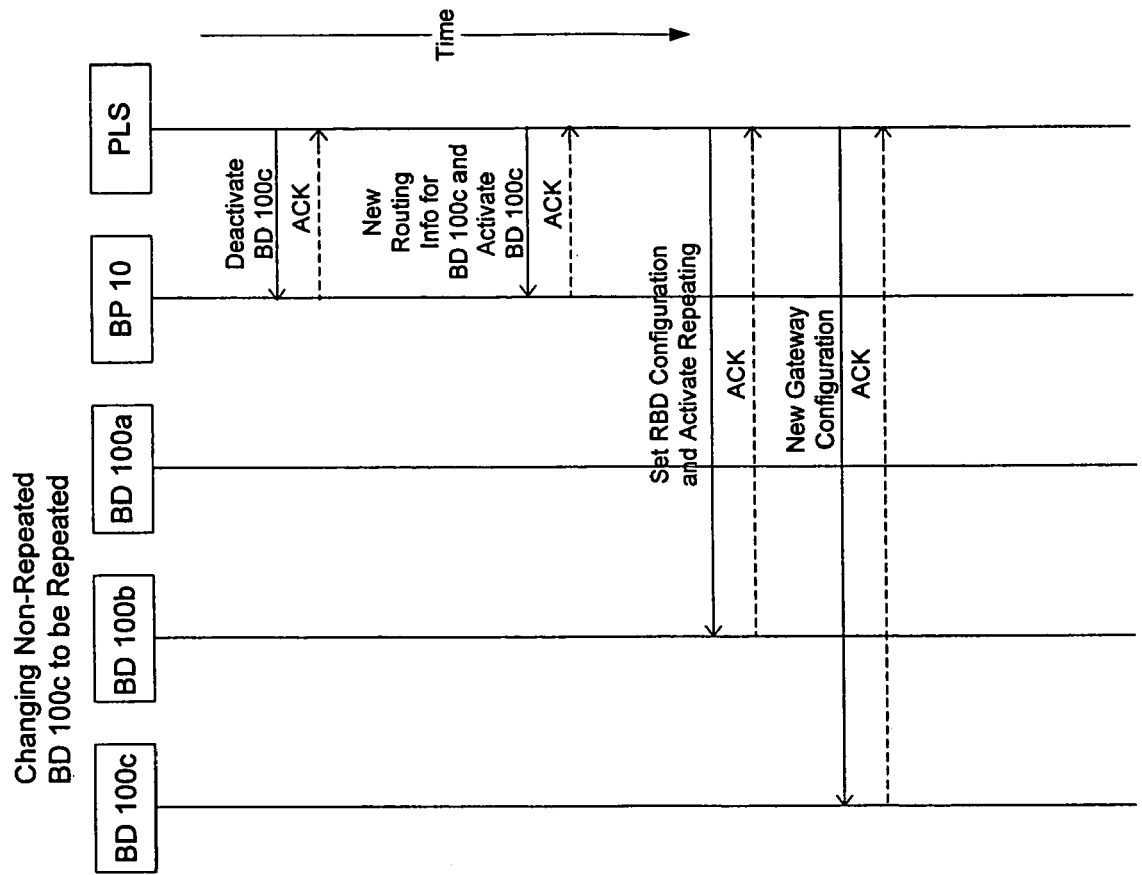
FIG. 10 is a timeline of a portion of the communications for changing a non-repeated network element device to be repeated in an example embodiment of the present invention.

FIG. 10 depicts an example of some of the communications employed to enable the repeater functionality. Specifically, in this schematic representation BD 100*b* is being enabled as a repeater for BD 100*c*. As shown, BD 100*c* is deactivated by the PLS at the BP 10 and at BD 100*c* until new routing information is transmitted to all involved devices. In addition, BD 100*b* is enabled as a repeater and provided with new configuration information and new gateway information is provided to BD 100*c*. Finally, BD 100*c* is sent an activation from the PLS to once again enable routing between its MV and LV interfaces.

Figure 11:
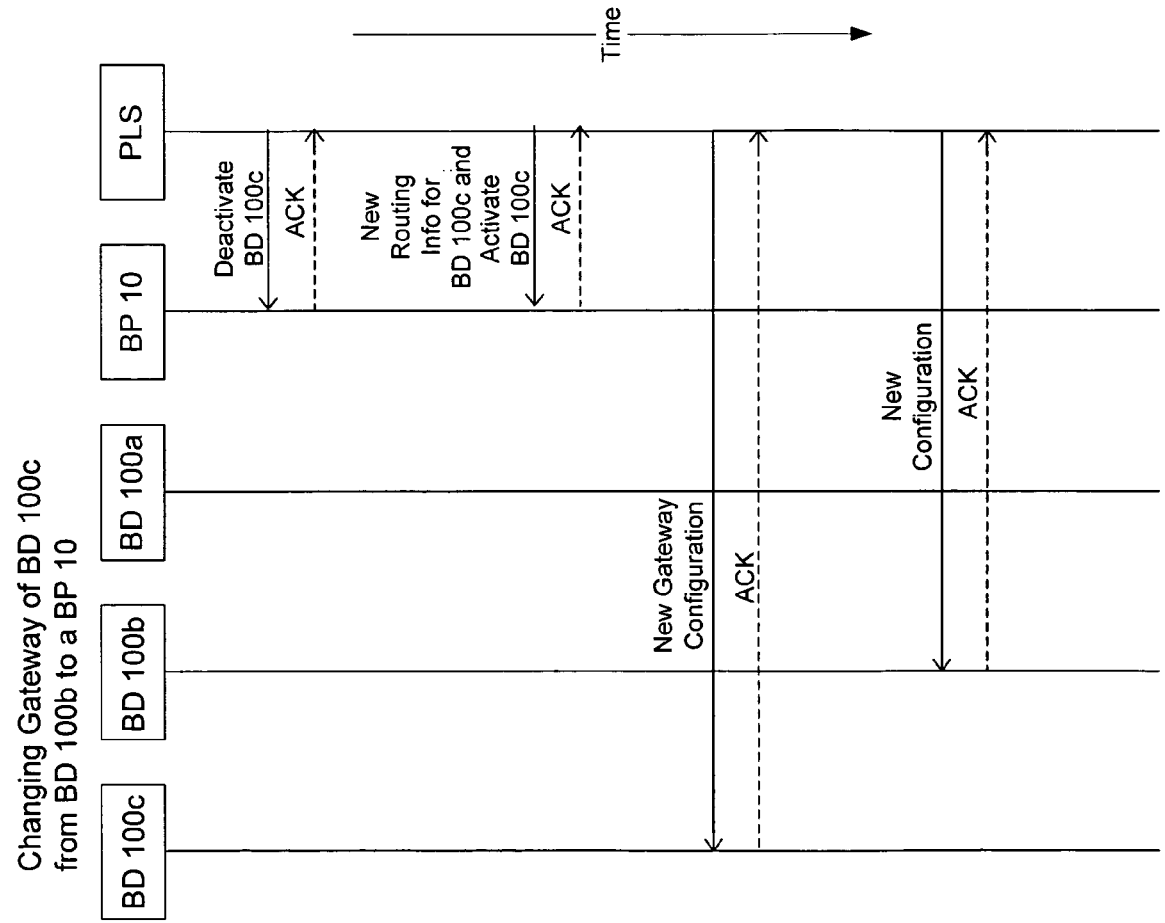
FIG. 11 is a timeline of a portion of the communications for changing a repeated network element to communicate with directly with a backhaul point in an example embodiment of the present invention

Similarly, FIG. 11 depicts an example of some of the communications employed to reconfigure a device so as to no longer repeat for another BD. In this example, RBD 100*b* is repeating for BD 100*c* and it is desirable to configure BD 100*c* to communicate directly with BP 10. In this schematic representation, BD 100*b* is being reconfigured so as not to repeat for BD 100*c*. As shown, BD 100*c* and RBD 100*b* are deactivated by the PLS at the BP 10 until new routing information is transmitted to all involved devices (e.g., BD 100*c*, RBD 110*b*, BP 10). In addition, BP 10 and RBD 100*b* are provided with new configuration information and new gateway information is provided to BD 100*c*. When the transmissions are complete, BD 100*c* may be sent an activation from the PLS to enable routing between its MV and LV interfaces and BD 100*c* will communicate directly with BP 10, instead of through RBD 110*b*. In addition, RBD 100*b* may be sent an activation from the PLS (although it may no longer be a repeating BD 100).

In this example PLCS, the MV power line may be segmented into different PLCS sections by the network designer. Each PLCS section may be served by a different BP 10. The BP 10 may be deployed near the center of the PLCS section and communicate with BDs 100 on each side of the BP 10. Each PLCS section may communicate using a different network encryption key (NEK) (or set of keys) to thereby prevent devices of different PLCS sections from receiving and processing data transmitted from each other. As discussed, the MV power line is a somewhat unpredictable communications channel. Consequently, it may be desirable to have a BD 100 that is communicating (or was intended to communicate) with a first BP 10 to instead communicate with a second BP 10. However, in order to do so, the BD 100 must be provided with the NEK for the other PLCS section and BP 10.

Thus, the BD software may include an algorithm for receiving and processing a command transmitted from the PLS to change the BD's MV NEK, thus causing the BD 100 to update its memory, non-volatile memory, and MV power line interface to match the specified NEK (i.e., change the NEK used by the MV modem). Furthermore, the method may include the option of clearing the BD's configuration, not including the new NEK, and, if the clear configuration option is selected, forcing a reboot such that the BD 100 restarts using the new MV NEK and defaults to the Alive state. The reboot may then cause the BD 100 to obtain its upstream gateway from the devices on the new PLCS section.

Finally, the BD 100 may include a software segment for receiving and processing commands from the PLS for specifying MAC addresses to which the BD 100 should not serve GNP Advertise messages (e.g., when the RBD 100 is acting as a potential gateway device). PLS The PLS is responsible for constructing and maintaining the RBD 100 to BD 100 hierarchy for each BD 100 on the MV link. The PLS may use the Northbound Interface Gateway Address received in the Alive Alert to construct the hierarchy. Thus, the Alive Alert's Northbound Interface Gateway Address may contain the IP address of the BD's BP 10. In the presence of RBDs 100, the Alive Alert's Northbound Interface Gateway Address may contain the IP address of the RBD 100 if the BD 100 attached to an RBD 100.

The PLS will associate the BD 100 to a chain of hops describing how packets will traverse to/from the BD 100 on the MV link. Portions of this hop information, which may be stored in memory, must be provided to the BD's BP 10 and each RBD 100 repeating for the BD 100. Thus, the PLS may transmit the information to those BDs 100 and BP 10, all of which include software for receiving and storing the information. These RBDs 100 and BP 10 typically will use this information to construct the appropriate ARP and route entries for repeated BDs 100.

As discussed, the PLS may include software for allowing the operator to reconfigure the path of a BD 100 in such a manner as to allow for any of the following: (1) changing a BD 100 from a direct BP 10 connection to being repeated by one or more RBDs 100 (see FIG. 10); (2) changing a repeated BD 100 to directly communicate with the parent BP 10 (see FIG. 11); (3) changing an RBD 100 to be repeated by another RBD 100; (4) changing a repeated RED 100 to directly communicate with the parent BP 10.

As discussed, the PLS may include software functionality for providing a method by which an operator may select a BD 100 to become an RBD 100. Furthermore, upon selection, the PLS may transmit new configuration information indicating that it should enable repeater functionality and the BD 100 will update its configuration in memory accordingly.

The PLS may include software configured to support the selection of devices to be repeated by a RBD 100. Furthermore, the PLS software may cause the transmission of the repeated BD 100 configuration information to the parent BP 10, the RBD 100, any intermediate RBDs 100, and the repeated BDs 100. As discussed, the PLS may store the data path for repeated BDs 100 and their LV subnets, including the hierarchy of RBDs 100 and the parent BP 10.

The PLS may include software for transmitting a request for the BD's configuration information, which includes the gateway negotiated via the GNP. The BDs 100 may include software for receiving the request and transmitting the information. The PLS also may include software to compare the received information with the information stored in the PLS database memory device and to provide an electronic, visual and/or audible operator alert should the received gateway information be different from what is stored in the PLS database.

The PLS may include software for allowing an operator to replace a BD 100 with another physical BD 100 unit that will receive and store the same configuration as the BD 100 being replaced. Furthermore, the PLS may notify the parent BP 10, and any repeated BDs 100 served by the replaced RBD 100, of the new data path through the replacement RBD 100. In this scenario, the MAC addresses of the replaced unit may change while the other information (such as IP addresses), which may be transmitted from the BP 10 and/or PLS may remain the same (i.e., provided to the new unit).

The PLS may include software functionality to verify that the configuration of the MV power line run is such that no BDs 100 are being repeated by an RBD 100 that is scheduled to be removed. Should the MV run be configured with BDs 100 still being repeated by the RBD 100 to be removed, the PLS may cancel the operation and notify the operator of the situation via an alert. To make this determination, the PLS may search its database to determine if the RBD 100 to be removed forms part of the data path (i.e., is a gateway) for any of the other BDs 100 or to determine whether the BD 100 to be removed has had its repeater function enabled (if not it is not repeating for any BDs).

The PLS may include software for pre-provisioning an as yet unactivated BD 100 to be a RBD 100. Furthermore, the PLS may include software for allowing an operator to pre-provision which BDs 100 will be repeated by the pre-provisioned RBD 100. This software of the PLS may, upon activation of a pre-provisioned RBD 100, transmit a notification to the parent BP 10 and any BDs 100 selected to be repeated by the RBD 100, of the data path through the pre-provisioned RBD 100.

As discussed, the PLS may include software for processing BD 100 statistics, (which includes RBD statistics). Thus, the PLS may include software for receiving and processing BD 100 statistics ready alert transmitted from a BD 100 (including RBDs). The PLS may include software for the automatically logging of the alert and requesting of statistics from a BD 100 upon receipt of an alert from the BD 100 (i.e., an alert that BD statistics are ready to be requested), and a method for processing the request response and storing of the BD statistics in the PLS database. The PLS may also include software to periodically request statistics from BDs 100 independent of statistics ready alerts from the BDs 100.

In addition, the PLS may include software for responding to an operator input by transmitting a request for the BD Statistics from any BD 100. Furthermore, the software may perform the steps of processing of the BD statistics response from the BD 100, and storing the BD statistics in the PLS database.

Automatically, or in response to an operator input, the software may transmit a request to a BD 100 (including RBDs 100) for the device's BP 10 LFoM information (or other measure of the quality of its communications links) for some or all the devices communications links. The PLS software may also transmit a request to BPs 10 for the device's LFoM information (or other measure of quality of its communications links) for all BDs 100 served by the BP 10. The PLS software may provide a method of obtaining and graphically displaying the physical link performance level (e.g., LFoM information or a quality indication related thereto) for upstream and downstream communication links for any device.

The PLS may include software to allow an operator to "re-home" a BD 100 from one MV run to another (i.e., communicate through a different BP 10). This portion of the PLS software may permit the handling all of the following scenarios: (1) homing an Alive BD 100 to another BP 10 with the same MV NEK; (2) homing an Online BD 100 to another BP 10 with the same MV NEK; (3) homing an Alive BD 100 to a BP 10 with a different MV NEK; and (4) homing an Online BD 100 to a BP 10 with a different MV NEK. To perform these tasks, the PLS may transmit new configuration information, and/or may transmit a new NEK and command a reboot with or without an indication for the device to clear its configuration (so that the device initializes and negotiates the GNP with the new NEK).

Due to changing power line conditions it is possible for a BD 100 or RBD 100 that has connectivity to the next device in the MV hierarchy to lose that connection when line conditions change (e.g., noise and/or changes to the power distribution network that adds attenuation to the MV power lines). In addition, it will be impossible for the network planners and NOC operators to choose BDs 100 and RBDs 100 with 100% accuracy. Thus, for reliability it may be desirable for the system to monitor connectivity. Thus, the PLS may transmit a command to request from some or all of the BDs 100 and BPs 10 to periodically transmit LFoM information to the PLS. From the data received, the PLS may determine (1) that a RBD 100 is not in the optimal location for repeating for the necessary BDs 100; (2) that a non-repeated BD 100 needs to be repeated by a RBD 100; (3) that a RBD 100 needs another layer of repeating (i.e., to be repeated by another RBD 100); and/or (4) that data to and from a BD 100 or RBD 100 no longer needs repeating. Thus, after receiving the LFoM data the PLS may execute an algorithm to automatically reconfigure the MV run and enable and/or disable the repeater functionality in one or more BDs 100 (and transmit new configuration information to the devices involved) to thereby make any of the changes listed above or other changes (e.g., change a BDs 100 RBD from a first RDB 100 to a different RBD 100, remove repeating for a BD 100, initiating repeating for a BD 100, etc.).

Example BD

Path from LV Power Line to MV Power Line

As shown in FIG. 5, signals from the LV power line may enter the BD 100 via the LV coupler 410 and LV signal conditioner 420. Example of such circuitry that may be used in the BD 100 is provided in U.S. application Ser. No. 10/641,689, entitled "Power Line Communication System and Method of Operating the Same," filed Aug. 14, 2003, which is hereby incorporated by reference in its entirety. Any type of coupler may be used including, but not limited to an inductive coupler, a capacitive coupler, a conductive coupler, or a combination thereof.

LV Modem

The LV modem 450 also may include one or more additional functional submodules such as an Analog-to-Digital Converter (ADC), Digital-to-Analog Converter (DAC), a memory, source encoder/decoder, error encoder/decoder, channel encoder/decoder, MAC (Media Access Control) controller, encryption module, and decryption module. These functional submodules may be omitted in some embodiments, may be integrated into a modem integrated circuit (chip or chip set), or may be peripheral to a modem chip. In the present example embodiment, the LV modem 450 is formed, at least in part, by part number INT51X1, which is an integrated power line transceiver circuit incorporating most of the above-identified submodules, and which is manufactured by Intellon, Inc. of Ocala, Fla.

The LV modem 450 provides decryption, source decoding, error decoding, channel decoding, and media access control (MAC) all of which are known in the art and, therefore, not explained in detail here.

With respect to MAC, however, the LV modem 450 may examine information in the packet to determine whether the packet should be ignored or passed to the router 310. For example, the modem 450 may compare the destination MAC address of the packet with the MAC address of the LV modem 450 (which is stored in the memory of the LV modem 450). If there is a match, the LV modem 450 removes the MAC header of the packet and passes the packet to the router 310. If there is not a match, the packet may be ignored.

Router

The data packet from the LV modem 450 may be supplied to the router 310, which forms part of the controller 300. The router 310 performs prioritization, filtering, packet routing, access control, and encryption. The router 310 of this example embodiment of the present invention uses a table (e.g., a routing table) and programmed routing rules stored in memory to determine the next destination of a data packet. The table is a collection of information and may include information relating to which interface (e.g., LVI 400 or MVI 200) leads to particular groups of addresses (such as the addresses of the user devices connected to the customer LV power lines and other BDs 100), priorities for connections to be used, and rules for handling both routine and special cases of traffic (such as voice packets and/or control packets).

The router 310 will detect routing information, such as the destination address (e.g., the destination IP address) and/or other packet information (such as information identifying the packet as voice data), and match that routing information with rules (e.g., address rules) in the table. The rules may indicate that packets in a particular group of addresses should be transmitted in a specific direction such as through the LV power line (e.g., if the packet was received from the MV power line and the destination IP address corresponds to a user device connected to the LV power line), repeated on the MV line (e.g., if the BD 100 is acting as a repeater), or be ignored (e.g., if the address does not correspond to a user device connected to the LV power line or to the BD 100 itself).

As an example, the table may include information such as the IP addresses (and potentially the MAC addresses) of the user devices on the BD's LV subnet, the MAC addresses of the PLMs 50 on the BD's LV subnet, the MV subnet mask (which may include the MAC address and/or IP address of the BD's BP 10 or RBD 100), the IP (and/or MAC) addresses of other BDs 100 (e.g., for which the device may be repeating), and the IP address of the LV modem 450 and MV modem 280. Based on the destination IP address of the packet (e.g., an IP address), the router may pass the packet to the MV modem 280 for transmission on the MV power line. Alternately, if the IP destination address of the packet matches the IP address of the BD 100, the BD 100 may process the packet as a command.

In other instances, such as if the user device is not provisioned and registered, the router may prevent packets from being transmitted to any destination other than a DNS server or registration server. In addition, if the user device is not registered, the router 310 may replace any request for a web page received from that user device with a request for a web page on the registration server (the address of which is stored in the memory of the router).

The router 310 may also prioritize transmission of packets. For example, data packets determined to be voice packets may be given higher priority for transmission through the BD 100 than data packets so as to reduce delays and improve the voice connection experienced by the user. Routing and/or prioritization may be based on IP addresses, MAC addresses, subscription level, type of data (e.g., power usage data or other enhanced power distribution system data may be given lower priority than voice or computer data), or a combination thereof (e.g., the MAC address of the PLM or IP address of the user device).

MV Modem

Similar to the LV modem 450, the MV modem 280 receives data from the router 310 and includes a modulator and demodulator. In addition, the MV modem 280 also may include one or more additional functional submodules such as an ADC, DAC, memory, source encoder/decoder, error encoder/decoder, channel encoder/decoder, MAC controller, encryption module, frequency conditioning module (to upband and/or downband signals) and decryption module. These functional submodules may be omitted in some embodiments, may be integrated into a modem integrated circuit (chip or chip set), or may be peripheral to a modem chip. In the present example embodiment, the MV modem 280 is formed, at least in part, by part number INT51X1, which is an integrated power line transceiver circuit incorporating most of the identified submodules and which is manufactured by Intellon, Inc. of Ocala, Fla.

The incoming signal from the router 310 (or controller) is supplied to the MV modem 280, which provides MAC processing, for example, by adding a MAC header that includes the MAC address of the MV modem 280 as the source address and the MAC address of the BP 10 (and in particular, the MAC address of the MV modem of the BP) or RBD 100 as the destination MAC address. In addition, the MV modem 280 also provides channel encoding, source encoding, error encoding, and encryption. The data is then modulated and provided to the DAC to convert the digital data to an analog signal.

First MV Signal Conditioner

The modulated analog signal from MV modem 280 is provided to the first MV signal conditioner, which may provide filtering (anti-alias, noise, and/or band pass filtering) and amplification. In addition, the MV signal conditioner may provide frequency translation. In this embodiment, the translation is from the 4–21 MHz band of the LV power line to the band of the MV power line, which in this embodiment may be a higher frequency band such as in the 30–50 MHz band. Thus, in this embodiment, Homeplug compliant data signals (e.g., Homeplug 1.0 or Homeplug AV) may be communicated on the LV power line to and from the customer premises. The use of an existing powerline communications standard may reduce the cost of the network and allow for easy installation of the equipment. Additionally, the same protocol (e.g., Homeplug 1.0 or AV) may also be used on the MV power lines at the same or at a different frequency band (e.g., 30–50 MHz). In another embodiment, the translation may be from the 4–30 MHz band of the LV power line to the band of the MV power line, which may be in the 24–50 MHz band. In this embodiment, translation of the frequency is accomplished through the use of a local oscillator and a conversion mixer. This method and other methods of frequency translation are well known in the art and, therefore, not described in detail.

MV Power Coupler Line

Data passing through the MV transmit/receive switch for transmission on the MV power line is supplied to the MV power line coupler 210, which may include impedance translation circuitry, transient suppression circuitry, and a coupling device. The coupling device couples the data onto the MV power line as a transmission.

The coupling device may be inductive, capacitive, conductive, a combination thereof, or any suitable device for communicating data signals to and/or from the MV power line. Examples of such couplers that may form part of an embodiment of the present invention are described in U.S. application Ser. No. 10/348,164, entitled "Power Line Coupling Device and Method of Using the Same," filed Jan. 21, 2003, which is hereby incorporated by reference in its entirety.

Example BD

Path from MV Power Line to LV Power Line

MV Modem

The MV modem 280 receives the output of the first MV signal conditioner 260. The MV modem 280 and LV modem 450 provide a bi-directional path and form part of the MV to LV path and the LV to MV path. The components of the MV modem 280 have been described above in the context of the LV to MV path and are therefore not repeated here. The incoming signal is supplied to the ADC to convert the incoming analog signal to a digital signal. The digital signal is then demodulated. The modem then provides decryption, source decoding, error decoding, and channel decoding all of which are known in the art and, therefore, not explained in detail here.

The MV modem 280 also provides MAC processing through the use of MAC addresses. In one embodiment employing the present invention, the MAC address is used to direct data packets to the appropriate device. The MAC addresses provide a unique identifier for each device on the PLC network including, for example, user devices, BDs, PLMs, repeaters and BPs (i.e., the LV modems and MV modems of the BDs, repeaters, and the BPs).

Based on the destination IP address of a received packet, the BP 10 will determine the MAC address of the MV modem 280 of the RBD 100 or, if there is a direct connection, of the BD 100 servicing the user device. The information for making this determination is stored in a table in the memory of the BP 10. The BP 10 will remove the MAC header of the packet and add a new header that includes the MAC address of the BP 10 (as the source address) and the MAC address of the RBD 100 or the BD 100 (the layer 2 destination address)—or more specifically, the MAC address of the MV modem 280 of the next downstream hop BD 100.

Thus, in this embodiment, packets destined for a user device on a LV subnet of a BD 100 (or to RBD 100) are addressed to the MAC address of the MV modem 280 of the BD 100 and may include additional information (e.g., the destination IP address of the user device) for routing the packet to devices on the BD's LV subnet or to another BD 100 or RBD 100.

If the destination MAC address of the received packet does not match the MAC address of the MV modem 280, the packet may be discarded (ignored). If the destination MAC address of the received packet does match the MAC address of the MV modem 280, the MAC header is removed from the packet and the packet is supplied to the router 310 for further processing.

There may be a different MAC sublayer for each physical device type such as for user devices and PLCS network elements (which may include any subset of devices such as backhaul devices, BDs, RBDs, dedicated repeaters, aggregation points, distribution points, and core routers).

Router

The MAC address of a network device will be different from the IP address. Transmission Control Protocol (TCP)/IP includes a facility referred to as the Address Resolution Protocol (ARP) that permits the creation of a table that maps IP addresses to MAC addresses. The table is sometimes referred to as the ARP cache. Thus, the router 310 may use the ARP cache or other information stored in memory to determine IP addresses based on MAC addresses (and/or vice versa). In other words, the ARP cache and/or other information may be used with information in the data packet (such as the destination IP address) to determine the layer 2 routing of a packet (e.g., to determine the MAC address of the next downstream hop having the destination IP address).

As discussed above, upon reception of a data packet, the MV modem 280 of a BD 100 will determine if the destination MAC address of the packet matches the MAC address of the MV modem 280 and, if there is a match, the packet is passed to the router 310. If there is no match, the packet is discarded.

In this embodiment, the router 310 analyzes packets having a destination P address to determine the destination of the packet which may be a user device, the BD 100 itself, a RBD 100, another BD 100, or the BP 10. This analysis includes comparing the information in the packet (e.g., a destination IP address) with information stored in memory, which may include the IP addresses of the user devices on the BD 100 LV subnet. If a match is found, the router 310 routes the packet through to the LV modem 450 for transmission on the LV power line. If the destination IP address corresponds the IP address of the BD 100, the packet is processed as a command or data intended for the BD 100 (e.g., by the Command Processing software described below) and may not be passed to the LV modem 450. If the destination IP address corresponds to another BD 100 (or RBD 100), the router may re-address the packet with the next hop MAC address in the path to the destination BD 100 (or RBD 100) and pass the data to the MV modem for transmission onto the MV power line. Alternately, if the destination IP address corresponds to the BP 10, the router may re-address the packet with the next upstream hop MAC address in the path to the BP 10 and pass the data to the MV modem for transmission onto the MV power line.

The term "router" is sometimes used to refer to a device that routes data at the IP layer (e.g., using IP addresses). The term "switch" or "bridge" are sometimes used to refer to a device that routes at the MAC layer (e.g., using MAC addresses). Herein, however, the terms "router", "routing", "routing functions" and the like are meant to include both routing at the IP layer and MAC layer. Consequently, the router 310 of the present invention may use MAC addresses instead of, or in addition to, IP addresses to perform routing functions.

In an alternate embodiment using IP address to route data packets, all packets received by the MV modem 280 may be supplied to the router 310. The router 310 may determine whether the packet includes a destination IP address that corresponds to a device on the BD's LV subnet (e.g., an address corresponding to a user device address or the BD's address). Specifically, upon determining the destination IP address of an incoming packet, the router 310 may compare the identified destination address with the addresses of the devices on the subnet, which are stored in memory. If there is a match between the destination address and the IP address of a user device stored in memory, the data is routed to the LV power line for transmission to the user device. If there is a match between the destination address and the IP address of the BD 100 stored in memory, the data packet is processed as a command or information destined for the BD 100.

In addition, the router 310 may also compare the destination address with the IP address of the BP 10, other BDs 100, LV subnets served of other BDs 100, or other repeaters (for example, if the BD is also acting as a repeater). If there is no match between the destination IP address and an IP address stored in memory, packet may be discarded (ignored).

According to any of these router embodiments, if the data is addressed to an address on the BD's LV or MV subnet (the network of devices with which the BD 100 can communicate and/or for which the BD 100 has an IP address stored therein), the router may perform any or all of prioritization, packet routing, access control, filtering, and encryption.

As discussed, the router 310 of this example embodiment of the present invention may use a routing table to determine the destination of a data packet. Based on information in the routing table and possibly elsewhere in memory, the router 310 routes the packets. For example, voice packets may be given higher priority than data packets so as to reduce delays and improve the voice connection experienced by the user.

The router 310 supplies data packets intended for transmission along the LV power line to the LV modem 450.

LV Modem

The functional components of the LV Modem 450 have been described above in the context of the LV to MV path and, therefore, are not repeated here. After receiving the data packet from the router 310, the LV modem 450 provides MAC processing, which may comprise adding a MAC header that includes the source MAC address (which may be the MAC address of the LV modem 450) and the destination MAC address (which may be the MAC address of the PLM 50 corresponding to the user device identified by the destination IP address of the packet).

To determine the MAC address of the PLM 50 that provides communications for the user device identified by the destination IP address of the packet, the LV modem 450 first determines if the destination IP address of the packet is an IP address stored in its memory (e.g., stored in its bridging table). If the IP address is stored in memory, the LV modem 450 retrieves the MAC address for communicating with the destination IP address (e.g., the MAC address of the PLM 50) from memory, which will also be stored therein. If the IP address is not stored in memory, the LV modem 450 transmits a request to all the devices to which it is coupled via the low voltage power line (e.g., all the PLMs). The request is a request for the MAC address for communicating with the destination IP address of the packet. The device (e.g., the PLM) that has the MAC address for communicating with the destination IP address will respond by providing its MAC address. The LV modem 450 stores the received MAC address and the IP address for which the MAC address provides communications in its memory (e.g., in its bridging table). The LV modem 450 then adds the received MAC address as the destination MAC address for the packet.

The packet is then channel encoded, source encoded, error encoded, and encrypted. The data is then modulated and provided to the DAC to convert the digital data to an analog signal.

Controller

As discussed, the controller 300 includes the hardware and software for managing communications and control of the BD 100. In this embodiment, the controller 300 includes an IDT 32334 RISC microprocessor for running the embedded application software and also includes flash memory for storing the boot code, device data and configuration information (serial number, MAC addresses, subnet mask, and other information), the application software, routing table, and the statistical and measured data. This memory includes the program code stored therein for operating the processor to perform the routing functions described herein.

This embodiment of the controller also includes random access memory (RAM) for running the application software and temporary storage of data and data packets. This embodiment of the controller 300 also includes an Analog-to-Digital Converter (ADC) for taking various measurements, which may include measuring the temperature inside the BD 100 (through a temperature sensor such as a varistor or thermistor), for taking power quality measurements, detecting power outages, measuring the outputs of feedback devices, and others. The embodiment also includes a "watchdog" timer for resetting the device should a hardware glitch or software problem prevent proper operation to continue.

This embodiment of the controller 300 also includes an Ethernet adapter, an optional on-board MAC and physical (PHY) layer Ethernet chipset that can be used for converting peripheral component interconnect (PCI) to Ethernet signals for communicating with the backhaul side of the BD 100. Thus, the RJ45 connector may provide a port for a wireless transceiver (which may be a 802.11 compliant transceiver) for communicating wirelessly to the BP 10 or other BD 100, which, of course, would include a similar transceiver. In an alternate embodiment, the BD 100 may include a MV modem for the NB interface and an Ethernet port for the SB interface to communicate with user device.

The BD 100 also may have a debug port that can be used to connect serially to a portable computer. The debug port preferably connects to any computer that provides terminal emulation to print debug information at different verbosity levels and can be used to control the BD 100 in many respects such as sending commands to extract all statistical, fault, and trend data.

In addition to storing a real-time operating system, the memory of controller 300 of the BD 100 also includes various program code sections such as a software upgrade handler, software upgrade processing software, the PLS command processing software (which receives commands from the PLS, and processes the commands, and may return a status back to the PLS), the ADC control software, the power quality monitoring software, the error detection and alarm processing software, the data filtering software, the traffic monitoring software, the network element provisioning software, and a dynamic host configuration protocol (DHCP) Server for auto-provisioning user devices (e.g., user computers) and associated PLMs.

In this embodiment, the router 310 (i.e., processor 320 executing the routing program code) shares a bus with the LV modem 450 and MV modem 280. Thus, the router 310 in this embodiment is not physically located between the two modems, but instead all three devices—the router 310, LV modem 450, and MV modem 280—are communicatively coupled together via the bus. In this embodiment the LV and MV modem physically share the same data bus, the bus is controlled by controller 300, meaning that packets go through the controller 300 and some level of the router 310. Alternately, in an alternate embodiment, in some instances (e.g., at the occurrence of a particular event) the router 310 may be programmed to allow the LV modem 450 to pass data directly to the MV modem 280 and vice versa, without performing data filtering and/or the other functions performed by the router 310 which are described above.

This embodiment of the BD 100 may only receive or transmit data over the LV power line at any one instant. Likewise, the BD 100 may only receive or transmit data over the MV power line at any one instant. However, as will be evident to those skilled in the art, the BD 100 may transmit or receive over the LV power line, while simultaneously transmitting or receiving data over the MV power line.

PLS Command Processing Software

The PLS and BD 100 (or RBD 100) may communicate with each other through two types of communications: 1) PLS Commands and BD responses, and 2) BD Alerts and Alarms. TCP packets are used to communicate commands and responses in the current embodiment. The commands typically are initiated by the NE portion of the PLS. Responses sent by the BD 100 (hereinafter to include RBDs 100) may be in the form of an acknowledgement (ACK) or negative acknowledgement (NACK), or a data response depending on the type of command received by the BD 100 (or RBD 100).

Commands

In addition to enabling and disabling the repeater functionality, the PLS may transmit any number of commands to the BD 100 to support system control of BD functionality.

As will be evident to those skilled in the art, most of these commands are equally applicable for BDs 100 that have the repeater function enabled. For ease of discussion, however, the description of the commands will be in the context of a BD only. These commands may include altering configuration information, synchronizing the time of the BD 100 with that of the PLS, controlling measurement intervals (e.g., voltage measurements of the ADC), requesting measurement or data statistics, requesting the status of user device activations, and requesting reset or other system-level commands. Any or all of these commands may require a unique response from the BD 100, which is transmitted by the BD 100 and received and stored by the PLS. The PLS may include software to transmit a command to any or all of the BDs 100 (and BPs 10) to schedule a voltage and/or current measurement at any particular time so that all of the network elements of the PLCS take the measurement(s) at the same time.

Alerts

In addition to commands and responses, the BD 100 (or RBD 100) has the ability to send Alerts and Alarms to the PLS (the NEI) via User Datagram Protocol (UDP), which does not require an established connection but also does not guarantee message delivery.

Alerts typically are either warnings or informational messages transmitted to the NEI in light of events detected or measured by the BD 100. Alarms typically are error conditions detected by the BD 100. Due to the fact that UDP messages may not be guaranteed to be delivered to the PLS, the BD 100 may repeat Alarms and/or Alerts that are critically important to the operation of the device or system.

One example of an Alarm is an Out-of-Limit Alarm that indicates that an out-of-limit condition has been detected at the BD 100, which may indicate a power outage on the LV power line, an MV or LV voltage to high, an MV or LV voltage too low, a temperature measurement inside the BD 100 is too high, and/or other out-of-limit conditions. Information of the Out-of-Limit condition, such as the type of condition (e.g., a LV voltage measurement, a BD temperature), the Out-of-Limit threshold exceeded, the time of detection, the amount (e.g., over, under, etc.) the out of limit threshold has been exceeded, is stored in the memory of the BD 100 and transmitted with the alert or transmitted in response to a request from the PLS.

Software Upgrade Handler

The Software Upgrade Handler software may be started by the BP 10 or BD 100 Command Processing software in response to a PLS command. Information needed to download the upgrade file, including for example the remote file name and PLS IP address, may be included in the parameters passed to the Software Command Handler within the PLS command.

Upon startup, the Software Command Handler task may open a file transfer program such as Trivial File Transfer Protocol (TFTP) to provide a connection to the PLS and request the file. The requested file may then be downloaded to the BD 100. For example, the PLS may transmit the upgrade through the Internet, through the BP 10, through the MV power line to the BD 100 where the upgrade may be stored in a local RAM buffer and validated (e.g., error checked) while the BD 100 continues to operate (i.e., continues to communicate packets to and from PLMs and the BP 10). Finally, the task copies the downloaded software into a backup boot page in non-volatile memory, and transmits an Alert indicating successful installation to the PLS. The BP 10 or BD 100 then makes the downloaded software the primary boot page and reboots. When the device restarts the downloaded software will be copied to RAM and executed. The device will then notify the PLS that it has rebooted via an alert indicating such.

ADC Scheduler

The ADC Scheduler software, in conjunction with the real-time operating system, creates ADC scheduler tasks to perform ADC sampling according to configurable periods for each sample type. Each sample type corresponds with an ADC channel. The ADC Scheduler software creates a scheduling table in memory with entries for each sampling channel according to default configurations or commands received from the PLS. The table contains timer intervals for the next sample for each ADC channel, which are monitored by the ADC scheduler.

ADC Measurement Software

The ADC Measurement Software, in conjunction with the real-time operating system, creates ADC measurement tasks that are responsible for monitoring and measuring data accessible through the ADC 330. Each separate measurable parameter may have an ADC measurement task. Each ADC measurement task may have configurable rates for processing, recording, and reporting for example.

An ADC measurement task may wait on a timer (set by the ADC scheduler). When the timer expires the task may retrieve all new ADC samples for that measurement type from the sample buffer, which may be one or more samples. The raw samples are converted into a measurement value. The measurement is given the timestamp of the last ADC sample used to make the measurement. The measurement may require further processing. If the measurement (or processed measurement) exceeds limit values, an alert condition may be generated. Out of limit Alerts may be transmitted to the PLS and repeated at the report rate until the measurement is back within limits. An out of limit recovery Alert may be generated (and transmitted to the PLS) when the out of limit condition is cleared (i.e., the measured value falls back within limit conditions).

The measurements performed by the ADC 330, each of which has a corresponding ADC measurement task, may include BD inside temperature, LV power line voltage, LV power line current (e.g., the voltage across a resistor), MV power line voltage, and/or MV power line current for example. MV power line measurements may be accomplished via a separate power line coupler, which may be an inductive coupler.

As discussed, the BD 100 includes value limits for most of these measurements stored in memory with which the measured value may be compared. If a measurement is below a lower limit or above an upper limit (or otherwise out of an acceptable range), the BD may transmit an Out-of-Limit Alert, which is received and stored by the PLS. In some instances, one or more measured values are processed to convert the measured value(s) to a standard or more conventional data value.

The measured data (or measured and processed data) is stored in the memory of the BD. This memory area contains a circular buffer for each ADC measurement and time stamp. The buffers may be read by the PLS Command Processing software functionality in response to a request for a measurement report or on a periodic basis. The measurement data may be backed up to non-volatile memory by a BD software task.

The LV power line voltage measurement may be used to provide various information. For example, the measurement may be used to determine a power outage, or measure the power used by a consumer or by all of the consumers connected to that distribution transformer. In addition, it may be used to determine the power quality of the LV power line by measuring and processing the measured values over time to provide frequency, harmonic content, and other power line quality characteristics.

The BD 100 also may include software for the gathering of repeating statistics, including but not limited to the number the packets and bytes transmitted from each repeated BD 100, the number of packets and bytes repeated for transmission to each repeated BD 100; and number of the packets dropped for each repeated BD 100. The BD software may include a code segment for setting and transmitting the statistics collection frequency in response to commands transmitted from the PLS.

The statistics collected may be stored periodically to non-volatile memory (e.g., at the same rate and times as the standard BD packet statistics).

The BD 100 also may include software for configuring a duration alert for transmitting a notice to the PLS that the statistics are ready or need to be transmitted to the PLS. The PLS may include software for determining when to collect periodic statistics and transmitting a request for the statistics in response to receiving the notice.

Traffic Monitoring Software

The Traffic Monitoring software may collect various data packet traffic statistics, which may be stored in memory including the amount of data (i.e., packets and/or bytes) communicated (i.e., transmitted and received) through the MV power line, and/or through the LV power line; the amount of data (packets and/or bytes) communicated (transmitted and received) to or from the PLS; the number of Alerts and Alarms sent to the PLS; the number of DHCP messages to or from user devices; the number of failed user device authentications; the number of failed PLS authentications; and the number of packets and bytes received and/or transmitted from/to each user device (or PLM 50).

Rate Limiting

The BD 100 may include software for monitoring the bit rate of a particular device (e.g., PLM, computer, television, stereo, telephone, fax, gaming device, etc.) and also for rate limiting the communications of the device. Thus, if the bit rate (i.e., number of bits communicated over a given time period) reaches a particular threshold value for the device (which may be stored in memory of the BD 100), the BD 100 may slow or stop (postpone) communications for that device (e.g., until the beginning of the next time period, which may be one or more seconds, milliseconds, minutes, or microseconds). The threshold value may be received from the PLS during initial configuration, after configuration, upon request by the user, or after a modification of the user's subscription level.

For example, a user may transmit a request to rate limit a particular device to the PLS, which would allow a parent to rate limit the communications of a child's gaming device (e.g., Xbox™, or Playstation™), the child's downloading of music or video, Voice of Internet Protocol (VoIP), peer to peer communications (e.g., often used to transfer MP3 music files), or the communication of video or image files. In response, the PLS may transmit a rate limiting command and information to the BD 100 to activate rate limiting of the device or process, which thereby initiates rate limiting in response to the PLS command. Thus, rate limiting may be effected for only select devices or processes of the subscriber, which may be requested by the user. As an example, a parent could turn off, turn on, or limit VoIP at certain times of the day or days of the week.

The rate limit information transmitted to the BD 100 may include information of the device (e.g., address) and/or process (e.g., which may be indicated by the type of packets communicated such as video, gaming, voice, computer, MP3) that are to be rate limited for that subscriber or device. Thus, the BD 100 may include information in memory sufficient to recognize certain types of processes (or packets), which is compared to communicated data to determine if rate limiting should be performed. Similarly, if rate limiting is based on address information (e.g., of the source and/or destination device), the BD 100 may include rate limiting address information in memory, which is compared to address information of the communicated data to determine whether rate limiting should be performed. The rate limit information may also include a first threshold value for upstream and a second threshold value for downstream communications, which may or may not be the same.

In one embodiment the home administrator may "setup" all the home users (and their limits) and the information may be stored in memory at the BD 100. When a home user logs in, their rule base will be attached to the virtual interface created by the login to perform the rate limiting. In a second embodiment, the home administrator may "setup" all the home users (and their limits) and the information may be stored in memory on a server at the POP. When a home user logs in, their rule base will be attached to the virtual interface created by the login to perform the rate limiting. In a third embodiment, the home administrator may "setup" all the home users (and their limits) and the information may be stored in memory on a server at the POP. When a home user logs in, their rule base will be attached to the virtual interface created by the login. The server will transmit a command and data to dynamically add or remove filter and rate limit rules to the BD 100, which will store the data in memory and filter and/or rate limit according to the received information. Rate limiting may implementing via Extensible Authentication Protocol (EAP), Point-to-Point Protocol Over Ethernet (PPPoE), or virtual private network (VPN).

The rate limiting software in the BD 100 (or remote POP server) may analyze the data packets and may limit the communication of data packets through the BD 100 based on data packets: 1) that are transmitted to the user device from a particular source (e.g., from a particular person, PLM, modem, user, domain name, email address, IP address and/or MAC source address); 2) that are transmitted from the user device to a particular destination (e.g., to a particular person, email address, user, domain name, modem, IP address and/or MAC destination address); 3) that have particular content (e.g., voice data, gaming data, image, audio, and/or video data); 4) based on the time of transmission or reception (e.g., times of the day and/or day(s) of the week); 5) that surpass a threshold quantity of data (either transmitted, received, or combination thereof) for a predetermined window of time (e.g., hour, minute, second, day, week, month, year, or subscription period); and/or 6) some combination thereof.

The rate limiting function may be used to rate limit or completely stop any or all such transmissions described above according any of such conditions. As an example of an application of rate limiting, the user may limit a particular device (e.g., a VoIP telephone) or data (VoIP data) to zero bits per second (bps) (i.e., prevent telephone calls) from 3 PM to 7 PM on Monday through Friday. Alternately, the user may limit gaming data to 1 Mbps from between 7PM to 9PM and allow the default rate (e.g., the rate provided to the user via the user's subscription which may also be controlled by the rate limiting function) during other times.

The BD 100 may also implement quality of service (QoS) for packets to and from certain devices, as a means to rate limit or in addition to rate limiting. For example, data of live voice communications (e.g., telephone voice communications) may be given higher priority than video data, which may be given higher priority than, gaming data, and computer data. Software on the user device may also add tags (bits) to the data packets to allow the BD 100 to recognize the type of packet for implementing QoS, rate limiting, and data filtering. Thus, the BD 100 may receive the QoS information via the power line from the PLS for a particular subscriber, device, or process, and store the information in memory. Subsequently, the PLS may change the QoS setting in response to a user request or a change in the user's subscription—as instructed by the PLS. For example, when the user transmits a request to upgrade his or her subscription from data to voice (telephone) and data, the PLS may transmit new QoS information to the BD 100 so that voice data of the user is given higher priority for transmission. Likewise, the PLS may transmit a similar command to the BP 10 so that voice data of the user is given higher priority for transmission.

Additionally, the PLS (via the BD 100) may transmit QoS information to the PLM/router device via the power lines, which may perform QoS as discussed, which may be in addition to or instead of the QoS performed by the BD 100. Thus, the BD 100 may manage each PLM and router on its subnet. As will be evident to those skilled in the art, the remote rate limiting described herein and remote QoS management may also be implemented in a non-power line system such as for cable modems or digital subscriber line (DSL) modems.

Data Filtering Software

The Data Filtering software provides filtering of data packets transmitted to and/or from a user device (or PLM 50). The filtering criteria may be supplied from the PLS (which may be based on requests received from the user) and is stored in memory of the BD 100 and may form part of the routing table. The Data Filtering software may analyze the data packets and may prevent the transmission of data packets through the BD: 1) that are transmitted to the user device from a particular source (e.g., from a particular person, user, domain name, email address, or IP or MAC source address); 2) that are transmitted from the user device to a particular destination (e.g., to a particular person, email address, user, domain name, or IP or MAC destination address); 3) that have particular content (e.g., voice data or video data); 4) based on the time of transmission or reception (e.g., times of the day and/or days of the week); 5) that surpass a threshold quantity of data (either transmitted, received, or combination thereof) for a predetermined window of time (e.g., a day, week, month, year, or subscription period); or 7) some combination thereof.

Provisioning a New User Device

Similarly, when a user installs a new user device on the LV subnet attached to the BD 100, the user device may need to be provisioned to identify itself on the network. To do so in this embodiment, the new user device transmits a DHCP request, which is received and routed by the BD 100 to a DHCP server running in the controller 300 of the BD 100. In response to the request, the BD 100 may respond by transmitting to the user device the IP address and subnet mask for the user device, the gateway IP address for the device's network interface to be used as the network gateway (e.g., the IP address of the LV modem 450 of the BD 100), and the IP addresses of the Domain Name Servers (DNS) all of which are stored in memory by the user device. In addition, the BD may transmit a new user device Alert to the PLS.

After provisioning, it may be necessary to register the user device with the network, which may require providing user information (e.g., name, address, phone number, etc.), payment information (e.g., credit card information or power utility account information), and/or other information to the registration server. The registration server may correlate this information with information of the utility company or Internet service provider. The registration server may form part of, or be separate from, the PLS. Until registered, the BD 100 prevents the user device (through its PLM 50) from communicating with (receiving data from or transmitting data to) any external network computer other than the registration server or the two DNSs. Thus, until the user device is registered, the BD 100 may filter data packets transmitted to and/or from the user device that are not from or to the registration server or a DNS. In addition, requests (such as HTTP requests) for other Internet web pages may be redirected and transmitted as a request for the registration web page on the registration server, which responds by transmitting the registration web page. Control of access of the user device may be performed by limiting access based on the IP address of the user device to the IP addresses of the registration server and DNSs.

After registration is successfully completed, the registration server communicates with the PLS to provide registration information of the user device to the PLS. The PLS transmits an activation message for the user device (or PLM 50) to the BD 100. In response, the BD 100 removes communication restrictions and permits the user device (and PLM 50) to communicate through the PLCS to all parts of the Internet. As will be evident to those skilled in the art, filtering of data and controlling access of the user device may be performed by limiting access based on the IP address or MAC address of the user device or the MAC address of the PLM 50 to which the user device is connected. Thus, the BD 100 may compare the source IP address (or MAC address) with information in its memory to determine if the IP address (or MAC address) is an address that has been granted access to the PLCS and beyond. The procedure above, or portions of the procedure, with respect to provisioning user devices may be used to provision a PLM instead of or in addition to a user device.

Furthermore, the repeater functionality may be used to repeat data to and from a pair of BPs 10. For example, a RBD 100 may receive data from a first BP 10 and repeat the data for reception by a second BP 10 in a manner described herein. The second BP 10 may also receive user data from the RBD 100 and other BDs 100. Similarly, the RBD 100 may receive data from the second BP 10 and repeat the data onto the MV power line for reception by the first BP 10, which may transmit that data to BDs 100 on its MV run. This application of the present invention may further reduce the need for backhaul media. In this embodiment, communications with the first BP 10 may employ a different NEK than the communications with the second BP 10 (and its child BDs 100). In an alternate embodiment, communications between the RBD 100 and one or both BPs 10 may use a communications channel that is orthogonal to the channel used by the child BDs 100 of the first and/or second BP 10. For example, the communications channel may employ a different frequency band (e.g., different than the band used for communications between the child BDs 100 and their BP 10), UWB, surface waves, wireless, or use the neutral conductor for communications (instead of the MV conductor). Thus, in the upstream direction, data may be received by a BD 100, by a first RBD 100, by the first BP 10, by a second RBD 100, by the second BP 10, and by the AP 20.

Downstream communications may follow the reverse path. The MV link of the present invention may be to provide upstream communications for a digital subscriber line (DSL) or high speed coaxial cable. Thus, the BD 100 may communicate with one or more users via a coaxial cable (DOCSIS) link or DSL link. Likewise, the backhaul link may be a DSL link or high speed coaxial cable (DOCSIS) link.

The BPs 10 described herein may include a medium voltage interface (MVI) and controller as described herein for use in the BD 100. The BP may also include a low voltage interface for servicing users via the low voltage power lines or other type of transceiver (e.g., a wireless modem) for servicing users via another medium such as wireless, coaxial, fiber optic, or twisted pair. In addition, the BP 10 may include a backhaul modem for communicating upstream via the backhaul link. The backhaul modem may be a power line modem (e.g., forming part of the MVI) for communicating via the MV power line or neutral conductor, a fiber optic transceiver, a wireless transceiver, a cable modem (e.g., a DOCSIS compliant modem), and/or other suitable modem or transceiver.

Finally, the PLS may transmit commands to one or more of the BDs 100 to repeat certain types of data more often than other types of data. For example, power usage data or other enhanced power distribution system (EPDS) data may not be time sensitive data and, therefore, additional repeating of that data, and the added latency that may be caused by the additional repeating may be tolerable. Consequently, each BD 100 may be configured to repeat certain (and different) types of data. For example, a first BD 100 on an MV run may be configured to repeat all data and another BD 100 on the at MV run may be configured to repeat only EPDS data. Thus, routing of the data may also be dependent on the data type.

Alternate Embodiments

As discussed, the BD 100 of the above embodiment communicates data signals to user devices via the LV power line. Rather than communicating data signals to the PLM 50 and/or user devices via the LV power line, the BD 100 may use other communication media. For example, the BD may convert the data signals to a format for communication via a telephone line, fiber optic, RF cable, or coaxial cable line. Such communication may be implemented in a similar fashion to the communication with LV power line as would be well known to those skilled in the art.

In addition, the BD 100 may convert the data signal to wireless signals for communication over a wireless communication link to the user device. In this case, the user device may be coupled to a wireless transceiver for communicating through the wireless communication link. The wireless communication link may be a wireless link implementing a network protocol in accordance with an IEEE 802.11 (e.g., a, b, or g) standard.

Alternatively, the BD 100 may communicate with the user device via fiber optic link. In this alternative embodiment, the BD 100 may convert the data signals to light signals for communication over the fiber optic link. In this embodiment, the customer premises may have a fiber optic cable for carrying data signals, rather than using the internal wiring of customer premise.

In another embodiment of the present invention the BD 100 may be linked to the customer premises via a coaxial cable. The coaxial cable may be connected to the BD 100 on its first end and to the low voltage power line on its second end via a power line/coaxial coupler (PLCC) at the customer premises. The PLCC may be comprised of a pair of high pass filters that permit the higher frequency data signals to couple between the coaxial cable and the power line, but prevent the lower frequency power signals from coupling therebetween. The first high pass filter may couple the concentric conductor of the coaxial cable to the neutral LV conductor and the second filter may couple the center conductor of the coaxial cable to the first energized LV conductor. The PLCC may make the connection to the LV power line by being plugged into an external outlet or be integrated into an external outlet (e.g., and having a coaxial connector exposed externally for connection). The PLCC also may include impedance matching and transient suppression circuits. Alternately, the PLCC may be integrated into the power meter (e.g., which may have the coaxial connector exposed) in which case the first filter of the PLCC may be coupled to the second energized LV conductor (e.g., instead of the neutral) to differentially transmit the data signals on the two LV energized conductors.

In an alternate embodiment, the PLCC may include a first modem and a power line modem (e.g., a power line modem chip set) communicatively coupled together. The first modem may provide communications with the BD 100 and the PLM may provide communications for the other PLMs in the customer premises that are coupled to the internal electrical wiring. The communications with the BD 100 may be OFDM (wherein the first modem may be a power line modem chip set) or DOCSIS (wherein the first modem may be a cable modem). In other embodiments, instead of a coaxial cable link between the BD 100 and the customer premises, the link may be a twisted pair, Ethernet, optical fiber or wireless. In still another embodiment, the BD 100 may not be connected to the internal LV power line network but instead may be connected to a customer premises wireless network (e.g., 802.11), the internal twisted pair telephone network, or the internal coaxial cable network.

Specifically, the BD 100 may include a wireless transceiver (e.g., a broadband transceiver such as an 802.11 transceiver) and communicate with a wireless broadband transceiver at the customer premises. The customer premises (CP) wireless device may include a wireless broadband transceiver and a power line modem that are communicatively coupled to each other. The CP wireless device may be plugged into a socket to derive power from the socket therefrom and to connect the power line modem of the CP wireless device to the internal power line network for communications to other power line modems (and their associated user devices) in the customer premises.

In any of these non-power line links to the customer premises, the BD 100 may include another transceiver, which may be a PLM, DOCSIS modem, digital subscriber line (DSL) modem, fiber optic transceiver, or wireless transceiver that is suitable for the access link. This transceiver may be employed instead of, or in addition to, the LVI described above, as determined by the architecture of the system. Thus, user devices in some customer premises may communicate with the BD 100 via a coaxial cable (via a first modem in the BD 100) and user devices in other customer premises may communicate with the BD 100 via their low voltage power lines (via a second modem in the BD, which may be a power line modem chip set). In some embodiments of the PLCS, the system may include a filter device (e.g., low pass filter) at or near the power meter so that in-home power line network communications do not egress onto the LV subnet and interfere with the power line communications between the BD 100 and other customer premises.

Furthermore, if significant bandwidth is needed, communications for user devices in a single home may use both the power line and non-power line medium. For example, high definition television data may be transmitted via the coaxial cable (which may also be connected to the internal coaxial cable network of the home instead of the LV power lines) and Internet traffic may be communicated via the low voltage power lines. Thus, the BD 100 may prioritize and route data traffic to the appropriate access link according to the data type (e.g., voice, Internet radio, video, image, Internet (HTML), and video gaming data), packet size (e.g., giving smaller packets lower or higher priority), and/or transmitting device (e.g., telephone device given higher priority).

In another embodiment, the PLCS may be used by the subscriber as a backup service to a cable Internet service provider (ISP), wireless ISP, or a DSL ISP. Thus, the BD 100 may be coupled to a switch in the customer premises. The switch may be a three port device with one port connected to the user device (e.g., a computer), a second port connected to the alternate ISP system and the third port connected to the PLCS (i.e., the BD 100). If the alternate ISP fails, or becomes slowed (e.g., due to high data traffic), the switch can be actuated to switch user device to be connected to the PLCS. Thus, the user device (e.g., computer), or the PLM, may include software for detecting a failed connection and/or a slowed connection, and for automatically actuating a switch to change to a different broadband provider upon detection. Alternately, the user device may be coupled to both the PLCS and the alternate ISP to increase bandwidth for the user, which may require a router at the customer premises. The alternate ISP may be used for some types of traffic (e.g., voice) and the PLCS may be used for other types of data types (e.g., Internet, HDTV).

In the customer premises, a single PLM may be connected to multiple user devices via a router. The router may be separate or integrated into the same housing as the PLM. The connection from the PLM/router to the user devices may be via an Ethernet connection, twisted pair, coaxial cable, or wireless (e.g., 802.11). Thus, the device may comprise a PLM configured to be plugged into a wall socket to receive and transmit data signals to and from the BD 100. The PLM may be connected to (or integrated into the same housing as) the router (e.g., via a bus or Ethernet connection). The router may be communicatively coupled to a plurality user devices (such as any of those described herein) via an Ethernet connection. Alternately, the router may be connected to a wireless transceiver (e.g., 802.11 or Bluetooth™) for wireless communications to a plurality of user devices. The Ethernet or wireless transceiver may also be integrated into the same housing as the PLM and router. In still another embodiment, the device may include both an Ethernet transceiver and wireless transceiver (in addition to the router and PLM).

The BD 100 may also include software for storing and distributing data to user devices (or caching certain data). For example, the PLS (or other remote computer system) may transmit advertisements to the BD 100 for storage in the BD 100. In addition, distribution information associated with the advertisements also may be transmitted to the BD 100 for storage. Thus, the BD 100 may transmit specific advertisements to a particular users based on the location of the user or other user information. The advertisements may be presented to the user as audio and/or visual and include pop-up advertisements, presented in "dashboard" area, and/or presented in a screen saver. The user device may include software for receiving and displaying the advertisements. In addition, the BD 100 may cache certain data (e.g., web pages), substantially similar to the manner in which pages are cached by the web browsers on computers. Furthermore, the BD 100 may buffer video data in its memory.

The PLCS may be used to detect a power outage and a power restoration. The PLS may periodically receive a ping or other communication from the BPs 10 and/or BDs 100. Alternately, the PLS may periodically transmit a command to select network elements (e.g., the BPs 10) and monitor communications for a response to the command. In either instance, if a communication is not received from the network element(s) within a predetermined time period as expected, the PLS may determine that a power outage has occurred. Upon detection of a power outage, the PLS may retrieve the location information of the non-responding (or non-communicative) devices, and transmit a power outage notice that includes the location information to the electric utility provider, which may dispatch utility crews to repair the outage. The PLS may store a list of devices (e.g., either BPs 10 or BPs 10 and BDs 100) for which there are no communications or are otherwise deemed to be located in an power outage area. The list of devices may include identifying information for each device, such as serial number, location, MAC address (e.g., of the northbound interface), IP address, or any other suitable identifier.

After a power outage has been detected, the PLS may monitor for communications from any of the devices located in an area for which a power outage had been detected. Upon receiving a communication from any such devices, such as an activation request or other initialization communication, the PLS may compare the identification information transmitted by the device (e.g., serial number, MAC address (e.g., of the northbound interface), location IP address, or any other suitable identifier) with the stored identifying information of the devices for which a power outage had been detected. If the PLS determines, based on the comparison, that a device in a power outage area is now receiving power, the PLS may transmit a notification, along with location information of the device(s) for which the power has been restored, to the electric utility provider.

The PLCS of the present invention may provide an "always on" communications channel. In an always on system, there are time periods when there is excess or unused bandwidth available. In other words, sometimes such systems are not being used to capacity or even near capacity, such as late at night or early in the morning. Thus, the PLCS (or other communications system) may offer services to make use of this otherwise unused communications capacity. For example, the PLCS operator may periodically backup all information (or substantially all data other than applications) from the user's computer system to a remote storage device. The transmission of the backed up information may begin early in the morning (e.g., 1:00 AM) when system resources are largely unused as dictated by the PLS. The backup may be performed periodically, such as daily, weekly, or monthly, or after receiving a request from the user in which case the backup may begin immediately or during the next non-peak or low use time period. The user may request the backup information, which may be transmitted to the user device via the PLCS or sent via mail (e.g., on a compact disc) to the user in response to the transmitted request.

The BD 100 described above may include a controller, low voltage interface, and medium voltage interface. The controller in the above embodiments may perform routing functions, which in some systems requires the demodulation of the received signals (in order to perform the routing). In another system, a different device (referred to herein as a high speed converter (HSC) device) may be located at the transformer or otherwise coupled to the MV power line and provide communications between the MV power line and the customer premises. The HSC device may include an MV coupler, such as the coupler described above and described in the application incorporated herein. Upon entering the HSC device, data from the coupler may traverse through a first filter, a first amplifier, a first frequency converter, a second filter, and a second amplifier to an antenna for wireless communications to the user devices at the customer premises (which themselves are coupled to a wireless transceiver). The first filter may band pass filter the data signals received from the MV power line (e.g., in the 30–50 Mhz), which is then amplified by the first amplifier. The filtered and amplified signals may then be frequency converted to the frequency used for wireless transmission. The frequency converted data signal may then filtered for the band of frequencies used for the wireless transmissions by the second filter, amplified by the second amplifier, and then transmitted via the antenna.

Data may also be wirelessly received from user devices at the customer premises via the antenna. Upon entering the HSC device, data from the antenna may traverse through a third filter, third amplifier, a second frequency converter, a fourth filter, and a fourth amplifier to the MV coupler for communication onto the MV power line to a RBD 100 or BP 10. The third filter may band pass filter the data signals received from the antenna (e.g., in an 802.11 or 60 Ghz band), which may then amplified by the third amplifier. The filtered and amplified signals may then be frequency converted to the frequency used for transmission over the MV power line (e.g., in the 30–50 Mhz). The frequency converted data signal may then filtered for the band of frequencies used for the MV power line transmissions by the fourth filter, amplified by the fourth amplifier, and then transmitted on the MV power line via the MV coupler. One benefit of the HSC device is that the lack of demodulation, modulation, and routing results in a very fast throughput, thereby being a device of low latency suitable for voice, video, gaming, and other real-time and low latency communications applications.

Other embodiments of the HSC device may include the components recited herein, but in a different sequence (e.g., the placement of the filter and amplifier may be reversed) or may have more (e.g., different) or fewer functional components than those described herein. The wireless signals may be transmitted via a licensed band or unlicensed band and may employ frequencies in any of the 4–21 MHz, 30–50 MHz, 2.4 GHz, 5 Ghz, 24 GHz, and/or 60 GHz bands. The wireless communications may employ any suitable wireless protocol such as, for example purposes only, those of IEEE 802.11a, b or g or a HomePlug compliant protocol (e.g., 1.0 or AV) transmitted wirelessly. The MV power line communications may use any suitable frequencies such as the 30–50 MHz or others. The MV power line communications may employ the same protocols as the wireless transmission (e.g., 802.11a, b, or g or a HomePlug compliant protocol such as 1.0 of AV) transmitted conductively. In one embodiment, at the customer premises the wireless signals are converted (if necessary) between wireless transmission frequency band and the 4–21 MHz band, which are used communicate over the customer premises internal power lines (e.g., Homeplug signals) via a powerline/wireless transceiver device. If necessary, the customer premises device may demodulate, routed, and modulate the data signals in order to change from the wireless protocol to the customer premises power line protocol (e.g. HomePlug).

Miscellaneous

As discussed, the functions of the PLM may be integrated into a smart utility meter such as a gas meter, electric meter, or water meter. The meter may be assigned an IP address by the PLCS (e.g., by the PLS) and, upon receiving a request or at predetermined intervals, transmit data such as consumption data to the BD 100, the PLS, and/or a utility computer system in a manner described herein, thereby eliminating the need to have utility personnel physically travel to read the meter. Thus, the meters may transmit real time power usage data, which may be stored at the PLS. A customer (or operator) may then access a database (e.g., via the internet with a web browser) to determine his or her real-time pricing (RTP), critical peak pricing (CPP) and time-of-use (TOU) pricing. The operator may further determine the total power being utilized by the network, and compare the data with the power being supplied to determine the efficiency of the network. In addition, one or more addressable switches, which may form part of a utility meter, may be controlled via the PLCS (e.g., with commands transmitted from the BD 100, the PLS, and/or utility computer system) to permit connection and disconnection of gas, electricity, and/or water to the customer premises. The meter also may be connected to the BD 100 via a coaxial cable that is connected to a connector on the meter collar, thereby providing a separate link to the meter. In addition, if a data filter has been installed on the LV power line, the coaxial cable may be coupled to the LV power line(s) on the customer premises side of the filter via the PLCC device described above to provide a path around the filter. The coaxial cable may provide a customer premises access link that does not interfere with other customers on the same LV subnet, because the coaxial cable is not connected to the other customer premises while the LV power lines of all the customer premises on the LV subnet are connected.

Similarly, the PLCS may be used to control MV power line switches. The addressable MV power line switch may be a motorized switch and assigned an IP address by the PLS, which is also provided to the utility-computer system to thereby operate the switch. When a power outage is detected, the utility company may remotely operate one or more addressable MV power line switches to provide power to the area where the outage is detected by transmitting commands to the IP addresses of the switches.

Likewise, the PLCS may be used to monitor, control and automate a capacitor switch that inserts or removes a capacitor (or capacitor bank) into the power distribution system. Capacitor banks are used to improve the efficiency of the power distribution network by providing Volt/VAr management (e.g., modifying the reactance of the power distribution network). Thus, the PLS may assign an IP address to one or more capacitor switches, which is also provided to the utility computer system to thereby operate the switch. Based on power quality measurements taken and received from one or more BDs 100, the utility company may insert or remove one or more capacitor banks by remotely actuating one or more capacitor bank switches by transmitting commands to the IP addresses of the switches.

The capacitor switch and the MV power line switch may be controlled by an embodiment of the present invention that includes an MV interface and controller. In addition, in some embodiments an LV interface may also be employed.

The PLM 50 in the above embodiments has been described as a device that is separate from the user device. However, the PLM 50 may also be integrated into and form part of the user device. In addition, the PLM may form part of a CP wireless network device. The CP wireless network device may include a PLM for communicating with the BD 100 or other access device. The PLM may be communicatively coupled to a router, which also may be communicatively coupled to a wireless transceiver (e.g., 802.11) for communicating with the user devices in the customer premises. Thus, the CP wireless network device may facilitate using the LV power lines and a wireless link to provide broadband access, while also providing a wireless network which may link the user devices together.

While the above described embodiments utilize a single modem in the LV interface and in the MV interface, alternate embodiments may use multiple modems in the LV interface and/or multiple modems in the MV interface. For example, the LV interface may comprise a receive path (for receiving data from the LV power lines) that includes an LV modem and signal conditioning circuitry and a transmit path (for transmitting data through the LV power lines) that includes a second LV modem and signal conditioning circuitry. Each LV modem may have a separate address (MAC and/or IP address) and operate at a separate frequency band. Thus, the receive or transmit LV interfaces may also include frequency translation circuitry for one or more of the LV modems.

Likewise, as another example the MV interface may comprise a receive path (for receiving data from the MV power line) that includes an MV modem and signal conditioning circuitry and a transmit path (for transmitting data through the MV power line) that includes a second MV modem and associated signal conditioning circuitry. Each MV modem may have a separate address (MAC and/or IP address) and operate at a separate frequency band. Thus, the receive or transmit MV interfaces may also include frequency translation circuitry for each MV Modem. Thus, the first MV modem may communicate in the 30–50 Mhz band and the second MV modem may communicate in the 4–21 Mhz or 4–30 Mhz band. In an alternate embodiment, both MV modems (and LV modems) may transmit and receive data and may be remotely enabled from a command transmitted from the PLS. In other words, the first and second MV modem (and first and second LV modem) may be enabled or disabled remotely upon receiving the corresponding enable/disable command from the PLS (transmitted via the MV power line). Thus, if there is enough attenuation of the data signals by the distribution transformers (so that LV signals do not bleed through the transformer and be received by either of the MV modems), both the LV band and the MV band may be used for communications over the MV and LV power lines. In addition, an RBD 100 may be employed in a manner that allows it repeat data without providing communications to any user devices (e.g., over the LV power lines) similar to a dedicated repeater. In such an instance, it may be desirable to disable the LV modem(s) and enable both MV modems for additional MV power line bandwidth and capacity (e.g., for providing backhaul link communications). In one embodiment of the present invention, the system may used to communicate EPDS data and therefore communicate the data by repeating the data over the MV power line or neutral conductor (e.g., via many dozens of RBDs 100). Such data might be repeated for one, two, five, ten or more miles as the data may not be latency sensitive. If broadband latency sensitive data needed to be communicated, BPs 10 and associated backhaul links may be installed along the PLCS network as needed.

As will be evident to those skilled in the art, the BPs 10 and PLMs 50 for communicating with these alternate embodiments of the bypass device (or RBD) would also require similar circuitry for transmitting and receiving with multiple modems and in the different frequency bands. More specifically, the modified BP 10 and/or PLM 50 would also require a first and second modem for transmitting and receiving, respectively, and designed to operate in the appropriate frequency bands for establishing communications. Such a system may permit full duplex communications through the power lines.

While the described embodiments may apply the data signals to one MV conductor (and the data signals may couple to other conductors), other embodiments may apply the data signals differentially. For example, a first MV coupler (and an associated MV interface) may be coupled to a first MV conductor for transmitting data on the MV conductor and a second MV coupler may be coupled to a second MV conductor for receiving the return current of the transmitted data. The two couplers may thus share a single MV modem. Similarly, the first and second couplers (coupled to the first and second MV power line conductors) may transmit (and receive) the data signals differentially. Thus, the same data signal may be transmitted down multiple MV conductors with the signal on each conductor being phase shifted (e.g., 120 degrees or 180 degrees) with respect to the signal(s) on the other conductor(s) or with substantially equal and opposite voltage polarity. Alternately, in any of these embodiments, the neutral conductor may be used (e.g., as a return path or separate transmission path) instead of one or more of the MV conductors.

The BP 10 may be coupled to each phase of the MV power line. In practice, however, this may not be necessary. In some embodiments, such as those communicating through overhead MV conductors, data signals may couple across the MV conductors. In other words, data signals transmitted on one MV phase conductor may be present on all of the MV phase conductors due to the data coupling between the conductors. As a result, the BP 10 may not need to be physically connected to all three phase conductors of the MV power lines and transmission from the BP 10 when coupling to one MV phase conductor will be received by the BDs 100 connected to the other MV phase conductors and vice versa. In some embodiments, however, which may include underground MV cables, it may be desirable to couple the BP 10 to all of the available phase conductors.

The BD 100 of the present invention also may include one or more sensors for collecting data, which may be processed, stored and/or transmitted to the PLS or other computer for processing and/or storage. For example, the BD 100 may include a level sensor incorporated inside its housing or attached to the utility pole that senses whether the sensor is level with ground (i.e., perpendicular to the pull of gravity). Thus, provided the level sensor is installed so that it is level to the ground, the BD 100, via the level sensor, can sense when (or if) the utility pole becomes tilted relative to the ground. Thus, the BD 100 may periodically detect or poll the level sensor. Upon detection of a tilt via the level sensor, the BD 100 may transit an alarm to the PLS, which may automatically and electronically transmit a notification to the computer system of the utility in order to dispatch a repair or inspection crew.

The BD 100 may also include one or more electric current sensors, which may include a magnetically permeable toroid and winding therethrough. At the utility pole, each current sensor may be coupled around a separate LV energized conductor connected to a customer premises. The winding may be connected to a resistor (which also is connected to ground) that is also connected an ADC, whose voltage may be periodically read by the processor. Thus, the BD 100 may periodically measure the current flowing to each customer premises (in each LV energized conductor), which may be processed, stored, and transmitted to the PLS (which may further process, store, and/or transmit the data). Because the BD 100 may also measure the voltage supplied to the customer premises, the BD 100 may thus be used to measure the power consumption of each customer premises. The real-time power consumption data may be stored in memory of the PLS or another computer and be supplied to the user upon transmitting a request for power usage data, which may be supplied to the user along with the real-time consumption cost to the user (i.e., the user's utility bill to date) via the PLCS. The data may also be processed by the BD 100 or PLS to provide customer load characteristics and patterns. Other sensors that may be connected to the BD 100 may include a camera (e.g., for monitoring security, detecting motion, confirming a truck roll, vegetation management, or monitoring automobile traffic flow), an audio input device (e.g., microphone for detecting noise, noise patterns, or particular sounds—any of which may be a precede and therefore predict an insulator or other EPDN component failure), a vibration sensor, a motion sensor (e.g., an infrared motion sensor), a wind speed and direction sensor, a thermometer (for measuring ambient temperature or measuring the temperature of the transformer casing, which may be value in predicting a transformer failure), and/or a barometer. The cameras also may be used to monitor electrical power distribution network infrastructure, such as substations, or to view power usage meters therein or elsewhere. The camera may be remotely controlled to allow zooming in, zooming out, panning left, right, up, or down. The video data or other sensed data may be transmitted via the PLCS to a remote computer for processing or may be processed by the BD 100. If the BD 100 or remote computer makes a detection (e.g., detects noise or a particular sound, detects motion, detects a qualified vibration, detects a pole tilt, etc.), an automated notification may be transmitted to the utility company or a user as the case may be. Such notification may also traverse the PLCS.

Other sensors that may be connected to, or integrated with, a power line modem inside the customer premises and communicate data via the BD 100 to a user device via the PLCS and Internet. Such sensors may include a camera (e.g., for monitoring security, detecting motion, monitoring children's areas, monitoring a pet area), an audio input device e.g., microphone for monitoring children, detecting noises), a vibration sensor, a motion sensor (e.g., an infrared motion sensor for security), a home security system, a smoke detector, a heat detector, a carbon monoxide detector, a natural gas detector, a thermometer, a barometer. The video data, audio or other sensed data may be transmitted via the PLCS to a remote computer for processing and/or presentation (audibly, visually, textually, and/or graphically) to the user via the internet on a presentation device such as a computer, mobile telephone, personal digital assistant (PDA), or other device. In addition, the power line modem may be connected to, or integrated with, control devices to allow the user to similarly remotely monitor (e.g., to receive settings and/or status such as on or off) and control (e.g., to turn on, turn off, and/or change settings) various home appliances and systems via any of the same user devices. For example, the power line modem may be connected to, or integrated into, a thermostat (to control heat and air conditioning and/or temperature setting), humidifier, air filtering mechanism, home computer, personal video recorder (e.g., to remotely set or start recording), tuner, digital cable set top box, video cassette recorder, stereo, oven, audio input device, video camera(s), refrigerator, dishwasher, hot water heater, fan, light, lighting system (e.g., to turn on or off select lights), copier, printer, answering machine, router, sprinkler system (e.g., to turn on or off select sprinklers), whirlpool (e.g., to remotely fill and/or heat), pool (e.g., to control heating, lighting, and/or filtering), motion sensor, home security system, smoke detector, natural gas detector, carbon monoxide detector, and heat detector. Likewise, detections by these sensors (e.g., a smoke detector detecting smoke) may cause a notification to be sent to the user device via the PLCS.

While the above embodiments of the BD 100 have been described as being communicatively coupled to a single LV subnet, other embodiments may be connected to multiple LV subnets. For example, the BD 100 may have two LV interfaces, with each LV interface being connected to a different LV subnet. Alternately, the BD 100 may have a single LV interface with two sets of connecting conductors and with each connecting conductor have a high pass filter in series with the connecting conductor (to isolate the power signals from the respective LV subnets). Alternately, two BDs 100 may be installed at one utility pole, but share a signal MV coupler that is connected to a "Y" connector, or splitter, which feeds the two BDs 100. Each BD 100, however, may be connected to separate LV subnets.

In the above embodiment, the processor performs routing functions and may act as a router in some instances and perform other functions at other times depending on the software that is presently being executed. The router may also be a chip, chip set, or circuit board (e.g., such as an off the shelf circuit card) specifically designed for routing, any of which may include memory for storing, for example, routing information (e.g., the routing table) including MAC addresses, IP addresses, and address rules.

Finally, the type of data signal coupled by the coupling device may be any suitable type of data signal. The type of signal modulation used can be any suitable signal modulation used in communications (Code Division Multiple Access (CDMA), Time Division Multiple Access (TDMA), Frequency Division Multiplex (FDM), Orthogonal Frequency Division Multiplex (OFDM), and the like). OFDM may be used for one or both of the LV and MV power lines. A modulation scheme producing a wideband signal such as CDMA or OFDM that is relatively flat in the spectral domain may be used to reduce radiated interference to other systems while still delivering high data communication rates.

In addition, instead of using OFDM signals on the MV power line or LV power line, an alternate embodiment of a PLCS system may use ultra wideband signals or surface wave signals (Goubau waves) to provide communications over the MV and/or LV power lines. In another embodiment, instead of using the MV power lines, the signals, which may be OFDM, UWB, surface waves signals, or another type of signal, may be transmitted on the neutral conductor(s) that span from transformer to transformer. Use of the neutral conductor may reduce the need to isolate from the high voltage of the MV power line and thereby reduce the cost of installation and of the coupler.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method of providing power line communications, comprising:
   transmitting one or more requests for available gateway device;
   receiving one or more responses in response to the one or more requests;
   selecting an upstream gateway device from the responses;
   storing information of the upstream gateway device in a memory;
   storing address information;
   receiving a first data in a packet via a medium voltage power line;
   determining whether the first data is to be repeated on the medium voltage power line based on the address information; and
   transmitting the first data on the medium voltage power line based on the determination.

2. The method of claim 1, further comprising:
   receiving a first command via the medium voltage power line; and
   disabling repeater functionality in response to the first command.

3. The method of claim 2, further comprising:
   receiving a second command via the medium voltage power line; and
   enabling repeater functionality in response to the second command.

4. The method of claim 3, further comprising receiving the address information via the medium voltage power line.

5. The method of claim 1, further comprising:
   accessing the address information to determine whether the first data is to be transmitted on the low voltage power line; and
   transmitting the first data on a low voltage power line if it is determined that the first data is to be transmitted on the LV power line.

6. The method of claim 1, wherein the one or more responses are transmitted from a plurality of responding devices, the method further comprising:
   determining the quality of the communications link with at least some of the plurality of responding devices; and
   wherein said selecting a gateway device is based, at least in part, on the quality of the communications link.

7. The method of claim 1, further comprising receiving the address information via the medium voltage power line.

8. The method of claim 1, further comprising re-addressing the packet of the first data if it is determined that the first data is to be repeated.

9. The method of claim 1, wherein the first data is transmitted if it is determined that the first data is to be repeated.

10. The method of claim 1, wherein the first data is not transmitted if it is determined that the first data is not to be repeated.

11. A power line communications device for providing communications to one or more user devices, comprising:
    a first modem configured to be communicatively coupled to a medium voltage power line;
    a second modem communicatively coupled to said first modem and configured to be communicatively coupled to the one or more of the user devices;
    a controller communicatively coupled to said first modem and said second modem;
    wherein said controller is configured to cause data received via said first modem having a first destination address to be transmitted by said second modem;
    wherein said controller is configured to cause data received via said first modem having a second destination address to be repeated over the medium voltage power line by said first modem; and
    wherein said controller is configured to:
       cause said first modem to transmit one or more requests for available gateways;
       select an upstream gateway from received responses to the requests; and
       store information of the selected upstream gateway in a memory.

12. The device of claim 11, wherein said controller is configured to cause data received via said second modem having a third destination address to be transmitted over the medium voltage power line by said first modem.

13. The device of claim 11, wherein said first destination address includes a media access control (MAC) address.

14. The device of claim 11, wherein said second destination address includes an address associated with a power line communications device coupled to the medium voltage power line.

15. The device of claim 11, wherein said second modem includes a modem configured to be communicatively coupled to a low voltage power line.

16. The device of claim 11, wherein said second modem includes a wireless transceiver configured to be wirelessly communicatively coupled to the one or more user devices.

17. The device of claim 11, wherein data packets having the second destination address are received via the medium voltage power line from a first power line communications device and said controller is configured to re-address data packets having the second destination address with address information of a second power line communications device.

18. The device of claim 11, wherein said controller includes a memory having address information stored therein.

19. The device of claim 18, wherein said controller is configured to compare the destination address of at least some of the data packets received via the first modem with said address information and, if the destination address of a data packet corresponds to address information, to cause said first modem to transmit the data over the medium voltage power line.

20. The device of claim 18, wherein said controller is configured to modify said address information in memory upon receiving a first command.

21. The device of claim 20, wherein the first command is received via said first modem from the medium voltage power line.

22. The device of claim 11, wherein said controller is configured to cause said first modem to transmit repeated packet statistical data over the medium voltage power line upon receiving a first command.

23. The device of claim 11, wherein said controller is configured to repeat data packets transmitted to and from one or more power line communications devices coupled to the medium voltage power line upon receiving a first command.

24. The device of claim 23, wherein said controller is configured to disable repeating for the one or more power line communications devices coupled to the medium voltage power line upon receiving a second command.

25. The device of claim 11, wherein address information of one or more power line communications devices for which said controller causes said first modem to repeat data is stored in memory; and
    said controller is configured to modify the information in memory to thereby cause said first modem to repeat data for one or more different power line communications devices coupled to the medium voltage power line upon receiving a first command.

26. A method of providing power line communications of a medium voltage power line, comprising:
    transmitting one or more requests for available gateway devices;
    receiving one or more responses in response to the one or more requests;
    selecting an upstream gateway device from the responses;
    storing information of the upstream gateway device in a memory;
    receiving a first data via the medium voltage power line;
    transmitting the first data over a low voltage power line;
    receiving a second data via the medium voltage power line; and
    transmitting the second data over the medium voltage power line.

27. The method of claim 26, wherein:
    the first data is included in a packet having a first destination address; and
    the second data is included in a packet having a second destination address.

28. The method of claim 26, further comprising:
    receiving a third data via the low voltage power line; and
    transmitting the third data over the medium voltage power line.

29. The method of claim 28, further comprising:
    receiving a fourth data via the medium voltage power line; and
    processing the fourth data as a command.

30. The method of claim 26, further comprising:
    receiving a third data via the medium voltage power line; and
    processing the third data as a command.

31. The method of claim 30, further comprising transmitting communications statistical data in response to the command.

32. The method of claim 30, further comprising disabling repeating in response to the command.

33. The method of claim 30, further comprising enabling repeating in response to the command.

34. The method of claim 30, further comprising rebooting in response to the command.

35. The method of claim 27, further comprising:
    receiving via the medium voltage power line a third data included in a packet having a third destination address;
    comparing the third destination address with address information stored in memory; and
    transmitting the third data over the medium voltage power line if the third destination address corresponds to address information stored in memory.

36. The method of claim 35, further comprising:
    receiving the address information via the medium voltage power line; and
    storing the address information in memory.

37. The method of claim 26, wherein the one or more responses are transmitted from a plurality of responding devices, the method further comprising:
    determining the quality of the communications link with at least some of the plurality of responding devices; and
    wherein said selecting a gateway device is based, at least in part, on the quality of the communications link.

38. The method of claim 26, further comprising:
    receiving address information via the medium voltage power line; and
    storing the address information in memory.

39. A device for providing power line communications; comprising:
    a first modem configured to receive and transmit data via a medium voltage power line;
    a second modem configured to be communicatively coupled to one or more user devices;
    a controller communicatively coupled to said first modem and said second modem and configured to have a repeat enabled configuration and a repeat disabled configuration;
    wherein said controller causes said first modem to repeat select data onto the medium voltage power line in said repeat enabled configuration; and
    wherein said controller causes said first modem to not repeat data onto the medium voltage power line in said repeat disabled configuration;
    wherein said controller is configured to:
        cause said first modem to transmit one or more requests for available gateways;
        select an upstream gateway from received responses to the requests; and
        store information of the selected upstream gateway in a memory.

40. The device of claim 39, wherein said controller is configured to receive a configuration command and said controller transitions from said repeat disabled configuration to said repeat enabled configuration in response to said configuration command.

41. The device of claim 39, wherein said controller is configured to receive and store address information of data to be repeated; and
    said controller is configured to cause said first modem to repeat data if an address of data corresponds to the address information of data to be repeated.

42. The device of claim 41, wherein said controller is configured to receive and store address information of data to be transmitted to the one or more user devices; and
    said controller is configured to cause said second modem to transmit data to the one or more user devices if an address of data corresponds to the address information of data to be transmitted to at least one of the user devices.

* * * * *

UNITED STATES PATENT AND TRADEMARK OFFICE
CERTIFICATE OF CORRECTION

| | |
|---|---|
| PATENT NO. | : 7,224,272 B2 |
| APPLICATION NO. | : 11/091677 |
| DATED | : May 29, 2007 |
| INVENTOR(S) | : White, II |

It is certified that error appears in the above-identified patent and that said Letters Patent is hereby corrected as shown below:

Title Page, Item (56), under "U.S. Patent Documents", in column 2, line 29, delete "Zalizky" and insert -- Zalitzky --, therefor.

Title Page, Item (56), under "Other Publications", in column 2, line 21, delete "Eectric" and insert -- Electric --, therefor.

In column 3, line 8, after "invention" insert -- . --.

In column 7, line 32, delete "10e" and insert -- 100e --, therefor.

In column 7, line 32, delete "10f" and insert -- 100f --, therefor.

In column 13, line 34, after "(MV modem)" delete "P" and insert -- IP --, therefor.

In column 14, line 67, delete "(RBD 110b)" and insert -- (RBD 100b) --, therefor.

In column 17, line 13, delete "RBD 110b" and insert -- RBD 100b --, therefor.

In column 17, line 19, delete "RBD 110b" and insert -- RBD 100b --, therefor.

In column 17, line 55, delete "PLS" and insert the same in Col. 17, Line 56, below "device)." as a heading.

In column 18, line 16, delete "RED" and insert -- RBD --, therefor.

In column 23, line 65, before "address" delete "P" and insert -- IP --, therefor.

UNITED STATES PATENT AND TRADEMARK OFFICE
CERTIFICATE OF CORRECTION

PATENT NO. : 7,224,272 B2
APPLICATION NO. : 11/091677
DATED : May 29, 2007
INVENTOR(S) : White, II It is certified that error appears in the above-identified patent and that said Letters Patent is hereby corrected as shown below:

In column 41, line 43, before "e.g.," insert -- ( --.

Signed and Sealed this

Twenty-fourth Day of July, 2007

JON W. DUDAS
*Director of the United States Patent and Trademark Office*